US009760315B2

(12) United States Patent
Taguchi

(10) Patent No.: US 9,760,315 B2
(45) Date of Patent: Sep. 12, 2017

(54) DYNAMIC DEVICE ALLOCATION APPARATUS, DYNAMIC DEVICE ALLOCATION SYSTEM, DYNAMIC DEVICE ALLOCATION METHOD AND STORAGE MEDIUM STORING DYNAMIC DEVICE ALLOCATION PROGRAM

(71) Applicant: NEC Corporation, Minato-ku, Tokyo (JP)

(72) Inventor: Masahiko Taguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 216 days.

(21) Appl. No.: 14/526,726

(22) Filed: Oct. 29, 2014

(65) Prior Publication Data
US 2015/0163205 A1    Jun. 11, 2015

(30) Foreign Application Priority Data
Dec. 5, 2013    (JP) ................................ 2013-251591

(51) Int. Cl.
*H04L 29/06* (2006.01)
*G06F 3/06* (2006.01)
(Continued)

(52) U.S. Cl.
CPC ............ *G06F 3/0673* (2013.01); *G06F 3/038* (2013.01); *G06F 3/1423* (2013.01);
(Continued)

(58) Field of Classification Search
CPC ...... G06F 3/0673; G06F 3/038; G06F 3/1423; G06F 3/1454; G06F 2203/0382;
(Continued)

(56) References Cited

U.S. PATENT DOCUMENTS 6,553,431 B1 *    4/2003    Yamamoto ......... H04N 1/32502
                                                        358/1.13
2002/0054303 A1 *    5/2002    Matsuyama ....... H04N 1/00132
                                                        358/1.2
(Continued)

FOREIGN PATENT DOCUMENTS

| JP | 10-187584 A | 7/1998 |
|----|-------------|--------|
| JP | 2004-192077 A | 7/2004 |
| JP | 2008-65828 A | 3/2008 |

*Primary Examiner* — Shanto M Abedin

(57) ABSTRACT

Disclosed is a dynamic device allocation apparatus capable of allocating dynamically and flexibly the I/O device, which inputs and outputs information, to the information processing carried out in the system.

The dynamic device allocation apparatus includes, a device allocation information storing unit to store device allocation information associating an identifier of an input device apparatus, an identifier of an output device apparatus, and an identifier of the designated information processing apparatus; a registration unit to generate the device allocation information, which specifies contents of the information processing, and to register the generated device allocation information with the device allocation information storing unit; and an instruction unit to generate information processing instruction information which instructs the input device apparatus, the output device apparatus and the information processing apparatus to carry out the information processing according to the device allocation information.

14 Claims, 28 Drawing Sheets

(51) Int. Cl.
*G06F 3/038* (2013.01)
*G06F 3/14* (2006.01)

(52) U.S. Cl.
CPC .......... *G06F 3/1454* (2013.01); *G06F 3/1446* (2013.01); *G06F 2203/0382* (2013.01); *G06F 2203/0383* (2013.01); *G09G 2370/022* (2013.01); *G09G 2370/025* (2013.01); *H04L 63/06* (2013.01)

(58) Field of Classification Search
CPC ........... G06F 2203/0383; G06F 3/0631; G06F 3/061; H04L 63/06; H04L 63/061; G09G 2370/025
USPC .................................. 713/168, 171; 719/321
See application file for complete search history.

(56) References Cited

U.S. PATENT DOCUMENTS

| | | | |
|---|---|---|---|
| 2003/0204701 A1* | 10/2003 | Mimatsu | G06F 3/0605 711/203 |
| 2005/0125426 A1* | 6/2005 | Minematsu | G06F 3/0605 |
| 2008/0178200 A1* | 7/2008 | Kaneko | G06F 3/1204 719/321 |
| 2008/0281942 A1* | 11/2008 | Nakahara | H04L 67/2861 709/218 |
| 2010/0004988 A1* | 1/2010 | Matsuo | G06Q 30/02 705/14.16 |
| 2011/0167146 A1* | 7/2011 | Murray | G06F 9/5061 709/223 |
| 2012/0030671 A1* | 2/2012 | Matsubara | H04L 67/34 718/1 |
| 2012/0259714 A1* | 10/2012 | Sano | G06Q 50/12 705/15 |
| 2013/0021647 A1* | 1/2013 | Ozaki | G06F 3/1204 358/1.15 |
| 2013/0061013 A1* | 3/2013 | Tokoro | G06F 11/1076 711/162 |
| 2014/0029033 A1* | 1/2014 | Takahashi | G06F 3/1297 358/1.13 |
| 2014/0156873 A1* | 6/2014 | Koara | G06F 9/4411 710/13 |

* cited by examiner

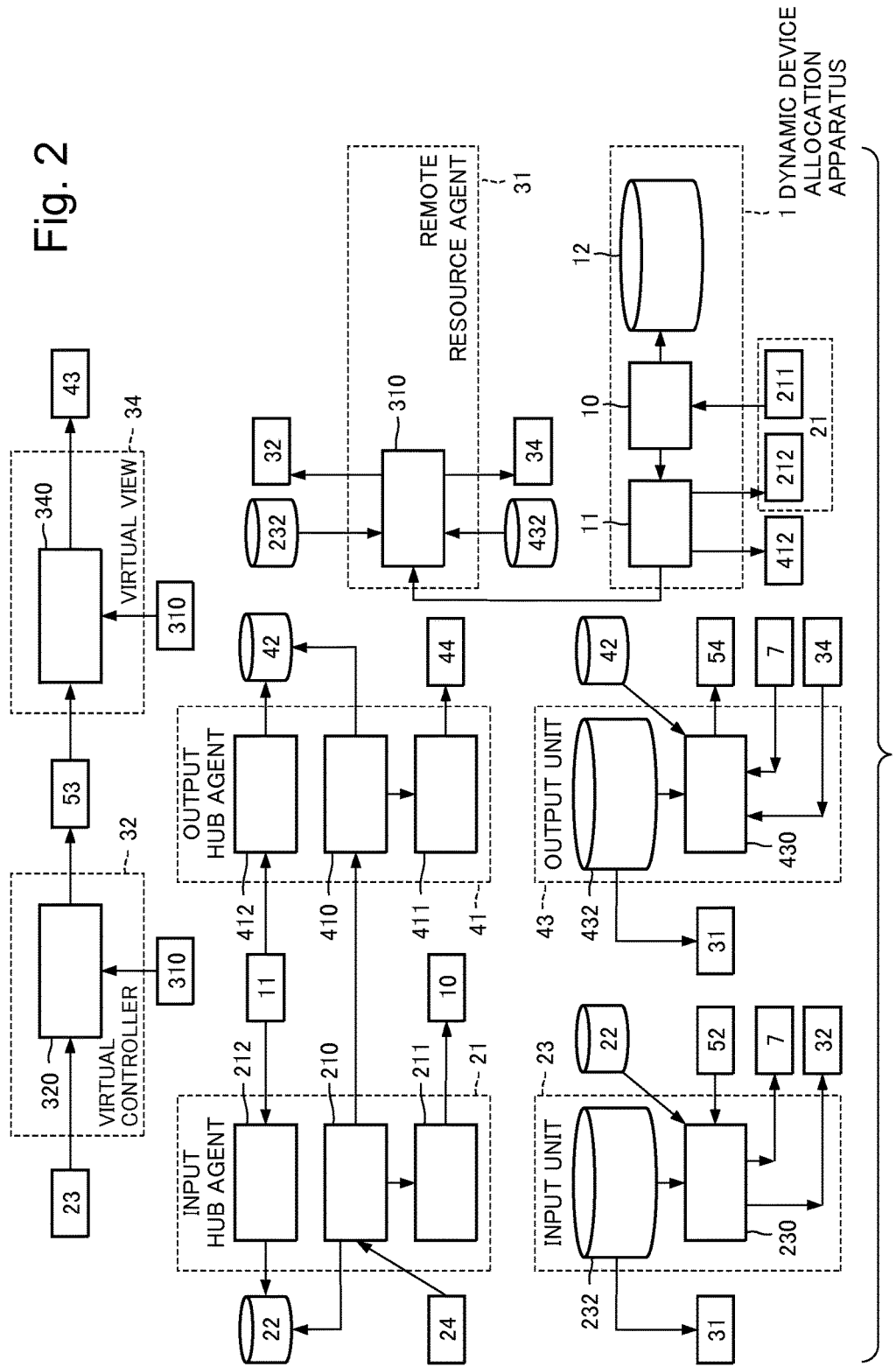

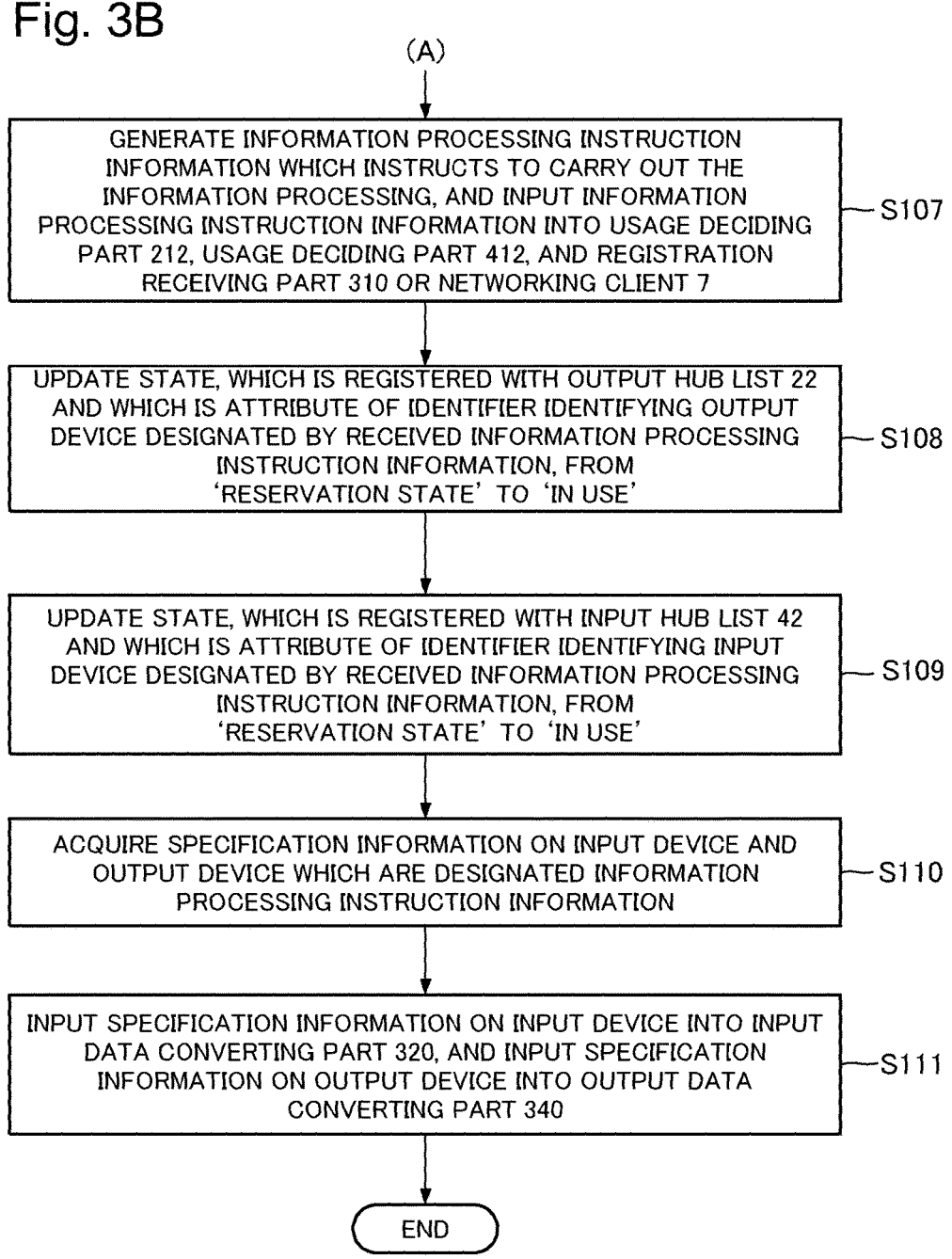

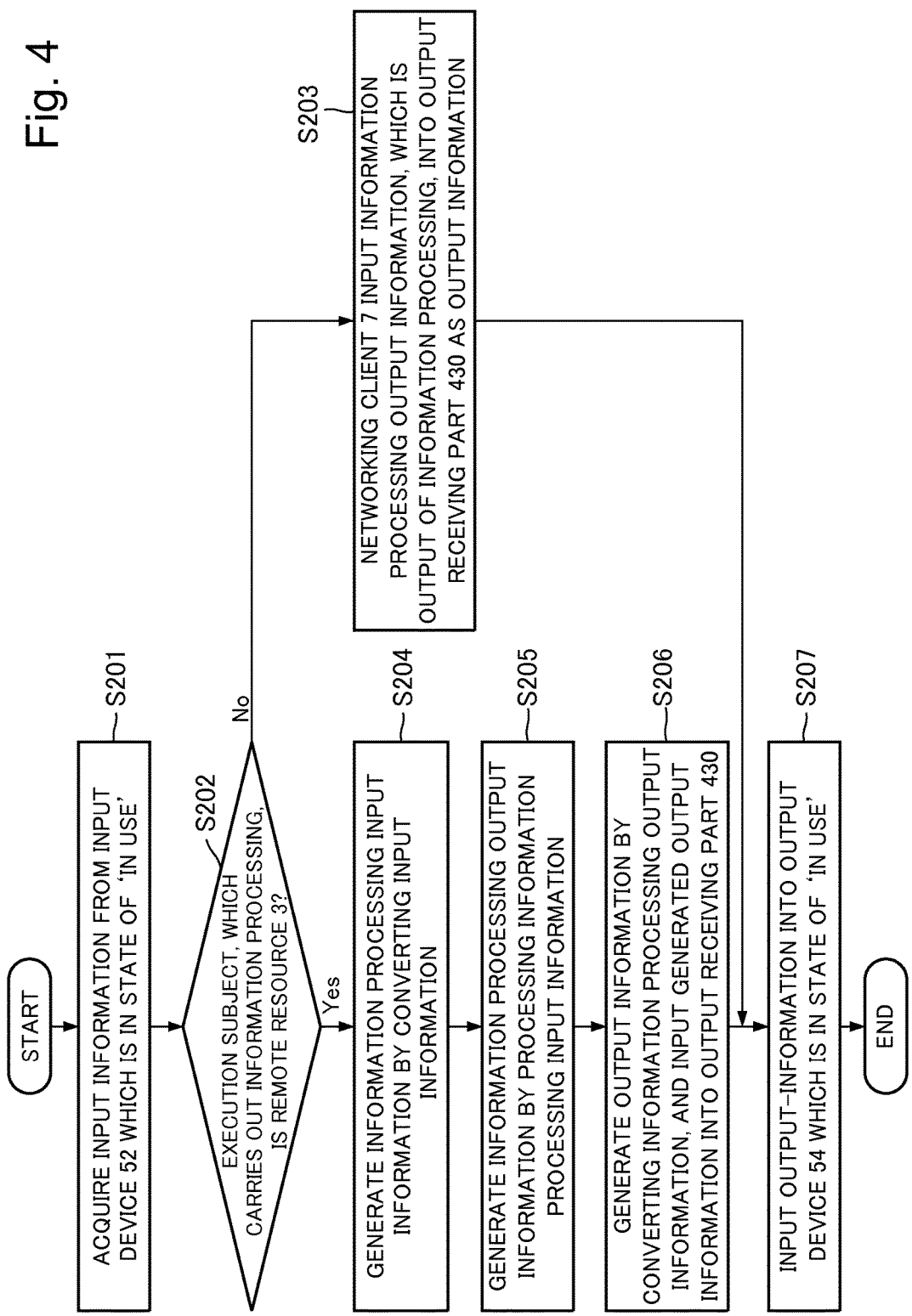

Fig. 8

DYNAMIC DEVICE ALLOCATION APPARATUS, DYNAMIC DEVICE ALLOCATION SYSTEM, DYNAMIC DEVICE ALLOCATION METHOD AND STORAGE MEDIUM STORING DYNAMIC DEVICE ALLOCATION PROGRAM

This application is based upon and claims the benefit of priority from Japanese Patent Application No. 2013-251591, filed on Dec. 5, 2013, the disclosure of which is incorporated herein in its entirety by reference.

TECHNICAL FIELD

The invention of the present application relates to a device allocation apparatus or the like which allocates an input device apparatus inputting target input information to which an information processing is carried out, and an output device apparatus outputting a result of the information processing which is carried out to the target input information.

BACKGROUND ART

In recent years, 'thin client', which is a solution enabling to do business without putting secret information in a local computing environment by utilizing an art to connect a remote computer, is get an attention in order to realize a high level security requirement. For example, software and a protocol such as VNC (Virtual Network Computing: registered trademark), RDP (Remote Desktop Protocol: registered trademark) or the like realize an operation in a remote desktop environment.

In general, the thin client aggregates computing environments by using a virtualization art in order to reduce a facility investment cost and electric power consumption. For example, software with the hypervisor function enables a plurality of computing environments, such as a plurality of OSs (Operating System) or the like, to operate on one CPU.

Meanwhile, as a need for doing business by using a mobile terminal becomes higher, to make the thin client environment and the mobile environment compatible each other is searched. For example, the application POCKET-CLOUD (registered trademark) enables a tablet terminal or the like to use a remote desktop environment by using VNC and RDP on iOS (registered trademark) or Android (registered trademark).

In a case of making the thin client environment and the mobile environment compatible each other, information leakage by peek is a serious security problem. This is a problem on security vulnerability which has not been systematized yet. For this reason, for example, by adopting a head mount display (HMD) as a screen of a remote desktop, it is expected to make the peek impossible.

FIG. 26 shows a user's utilization form which combines the thin client environment and HMD. Since it is difficult generally to carry out an input operation smoothly in the case of HMD, it is supposed to use a terminal apparatus such as a touch pad or the like at the same time. Input information which a user inputs by use of a touch pad 1000 is sent to a data center 1002 through a wireless AP (Access Point) 1001. The data center 1002 carries out information processing to the received input information, and outputs the processed information as output information, and the output information, which passes through the wireless AP 1001, is displayed on HMD 1003.

In this case, it is necessary to manage the touch pad 1000 which is an input device, and HMD 1003 which is an output device as nodes different each other in a communication network, and to connect these devices so that the security vulnerability may become small. Accordingly, an art to connect the I/O devices flexibly and safely becomes more important.

As an art related to such the art, a patent literature 1 (Japanese Unexamined Patent Application Publication No. Hei10-187584) discloses a system that an I/O device and a control mechanism for the I/O device are arranged separately and are connected each other through a communication network. The system mentioned above has a configuration that the I/O device and the control mechanism for the I/O device are not connected fixedly in one to one correspondence, but are connected at every necessary time.

As a related art, a patent literature 2 (Japanese Unexamined Patent Application Publication No. 2004-192077) discloses a system that, when providing a service on the basis of a service scenario, an apparatus or the like which has a function indicated in the scenario is searched locally. By carrying out association among used apparatuses to each found apparatus, the system applies the same service to various locations and facilities.

As a related art, a patent literature 3 (Japanese Unexamined Patent Application Publication No. 2008-065828) discloses an art that, in a system to carry out a performance analysis on a supply chain facility, information and data which are transferred through a communication network are encrypted.

SUMMARY

In order to construct flexibly a system which includes a combination of the thin client environment and the mobile environment, it is requested that I/O devices, which input or output information related to information processing carried out in the system, are allocated flexibly to each information processing with no restriction due to a physical configuration of the system.

The arts disclosed in the patent literature 1 and 2 assume that all apparatuses such as the I/O device or the like are connected with the communication network, and send and receive information through the communication network. However, with respect to the information processing carried out in the system, there is a case that, for example, information flows from the input device to the output device not through the communication network, and the arts disclosed in the patent literature 1 and 2 do not assume the case. Moreover, the art disclosed in the patent literature 3 is not the art which allocates the I/O device flexibly to the information processing carried out in the system. Accordingly, it is difficult for the arts disclosed in the patent literature 1 to 3 to solve the problem mentioned above sufficiently.

A main object of the invention according to the present application is to provide a dynamic device allocation apparatus or the like which can solve the problem mentioned above.

A dynamic device allocation apparatus according to an exemplary aspect of the present invention includes: a device allocation information storing unit to store device allocation information associating an input device identifier which can identify an input device apparatus inputting information into a designated information processing apparatus, an output device identifier which can identify an output device apparatus inputting information which is outputted from the designated information processing apparatus, and an information processing apparatus identifier capable of identifying the designated information processing apparatus which inputs a result of information processing carried out to information, which is inputted from the input device apparatus which is designated, into the output device apparatus which is designated; a registration unit to generate the device allocation information, which specifies contents of the information processing, when the designated information processing apparatus carries out the information processing, and to register the generated device allocation information with the device allocation information storing unit; and an instruction unit to generate information processing instruction information which instructs the input device apparatus, the output device apparatus and the information processing apparatus to carry out the information processing according to the device allocation information which the device allocation information storing unit stores.

A dynamic device allocation method according to an exemplary aspect of the present invention includes: by a first information processing apparatus, storing device allocation information in a device allocation information storing unit, which is associating an input device identifier which can identify an input device apparatus inputting information into a designated second information processing apparatus, an output device identifier which can identify an output device apparatus inputting information which is outputted from the designated second information processing apparatus, and an information processing apparatus identifier capable of identifying the designated second information processing apparatus which inputs a result of information processing carried out to information, which is inputted from the input device apparatus which is designated, into the output device apparatus which is designated; by the first information processing apparatus, generating the device allocation information, which specifies contents of the information processing, when the designated second information processing apparatus carries out the information processing, and registering the generated device allocation information with the device allocation information storing unit; and by the first information processing apparatus, generating information processing instruction information which instructs the input device apparatus, the output device apparatus and the second information processing apparatus to carry out the information processing according to the device allocation information which the device allocation information storing unit stores.

A non-transitory computer-readable medium according to an exemplary aspect of the present invention stores a computer program causing a computer to realize: a device allocation information storing function that stores device allocation information in a device allocation information storing unit, which is associating an input device identifier which can identify an input device apparatus inputting information into a designated information processing apparatus, an output device identifier which can identify an output device apparatus inputting information which is outputted from the designated information processing apparatus, and an information processing apparatus identifier capable of identifying the designated information processing apparatus which inputs a result of information processing carried out to information, which is inputted from the input device apparatus which is designated, into the output device apparatus which is designated; a registration function that generates the device allocation information, which specifies contents of the information processing, when the designated information processing apparatus carries out the information processing, and to register the generated device allocation information with the device allocation information storing unit; and an instruction function that generates information processing instruction information which instructs the input device apparatus, the output device apparatus and the information processing apparatus to carry out the information processing according to the device allocation information which the device allocation information storing unit stores.

BRIEF DESCRIPTION OF THE DRAWINGS

Exemplary features and advantages of the present invention will become apparent from the following detailed description when taken with the accompanying drawings in which:

FIG. 2 is a block diagram showing a detailed configuration of the dynamic device allocation system according to the first exemplary embodiment of the invention of the present application;

FIG. 3B is a flowchart (2/2) showing the device registration operation of the dynamic device allocation system according to the first exemplary embodiment of the invention of the present application;

FIG. 4 is a flowchart showing a device usage operation of the dynamic device allocation system according to the first exemplary embodiment of the invention of the present application;

FIG. 8 is a block diagram showing a physical configuration of a second modification of the dynamic device allocation system according to the first exemplary embodiment of the invention of the present application;

EXEMPLARY EMBODIMENT

Hereinafter, an exemplary embodiment of the present invention will be described in detail with reference to drawings.

First Exemplary Embodiment

Figure 1:
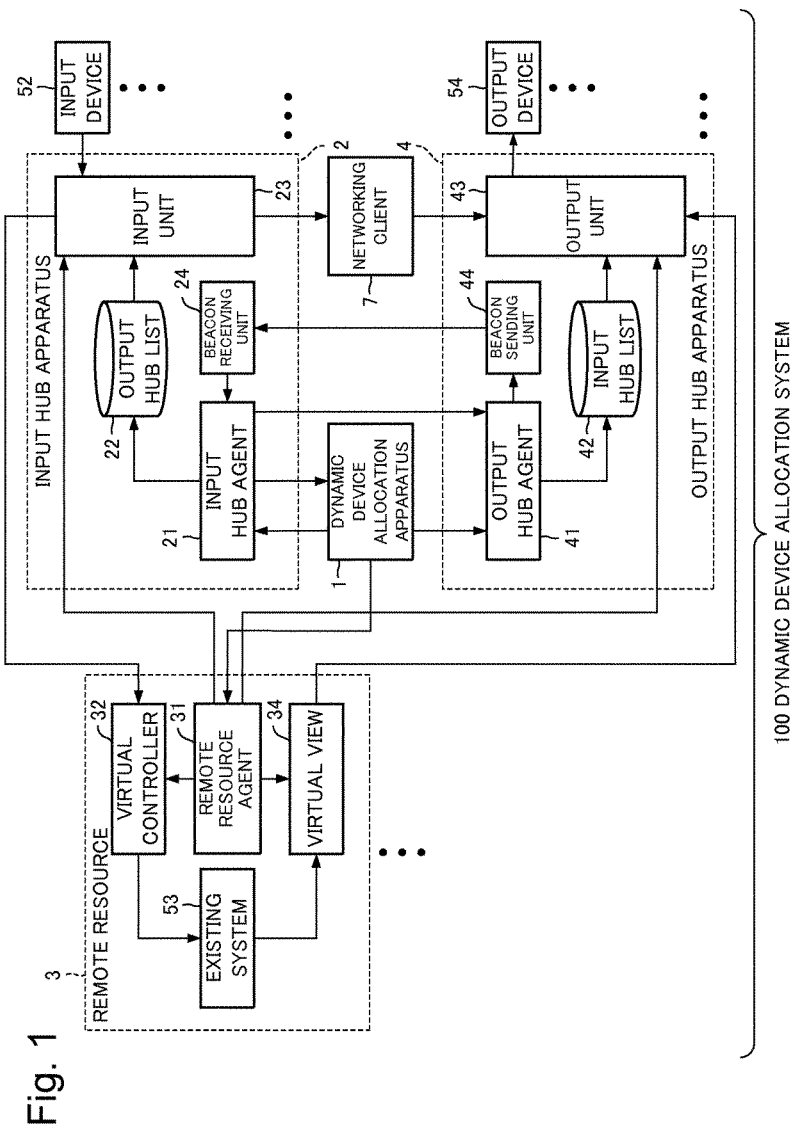
FIG. 1 is a block diagram showing an outlined configuration of a dynamic device allocation system according to a first exemplary embodiment of the invention of the present application.

FIG. 1 is a conceptual block diagram showing an outlined configuration of a dynamic device allocation system 100 of a first exemplary embodiment. FIG. 2 is a conceptual block diagram showing a detailed configuration of the dynamic device allocation system 100 of the first exemplary embodiment.

The dynamic device allocation system 100 includes a dynamic device allocation apparatus 1, an input hub apparatus 2, a remote resource 3, an output hub apparatus 4, an input device 52, an output device 54 and a networking client 7. Here, while number of each component, which is described in the figure, is just one for convenience of explanation, there is a case that the dynamic device allocation system 100 includes a plurality of components of the same type.

When information processing is carried out in the dynamic device allocation system 100, the dynamic device allocation apparatus 1 associates dynamically an input device which inputs information into the information processing, and an output device which outputs a result of the information processing. The dynamic device allocation apparatus 1 includes a registration unit 10, an instruction unit 11 and a device allocation information storing unit 12. There is a case that each of the registration unit 10 and the instruction unit 11 is an electronic circuit, or is a computer program and a processor which works according to the computer program. The device allocation information storing unit 12 is an electronic circuit or an electronic device such as an electronic memory, a magnetic disk or the like to which access control is carried out by a computer program and a processor working according to the computer program.

When a specific information processing is carried out in the dynamic device allocation system 100, the registration unit 10 receives base information, which is used when generating device allocation information on the information processing, from the input hub apparatus 2. The device allocation information is information which associates an identifier which can identify the remote resource 3 or the networking client 7 carrying out the information processing, an identifier which can identify the input device inputting information into the information processing, and an identifier which can identify the output device inputting information outputted from the information processing. After generating the device allocation information on the basis of the received base information, the registration unit 10 registers the generated device allocation information with the device allocation information storing unit 12, and sends a notification, which indicates that the device allocation information is registered, to the instruction unit 11.

The device allocation information storing unit 12 stores the inputted device allocation information as one record. After receiving the notification which indicates that the device allocation information is registered, the instruction unit 11 reads the device allocation information from the device allocation information storing unit 12. The instruction unit 11 generates information processing instruction information to instruct the remote resource 3 or the networking client 7, the input device and the output device, which are identified by each identifier included in the device allocation information, to carry out the information processing. The instruction unit 11 sends the information processing instruction information to the input hub apparatus 2, the output hub apparatus 4, and the remote resource 3 or the networking client 7.

The input hub apparatus 2 controls inputting information which is provided by each input device such as the input device 52 or the like. The input hub apparatus 2 includes an input hub agent 21, an output hub list 22, an input unit 23 and a beacon receiving unit 24. The input hub agent 21 includes a usage reservation requesting part 210, a mapping requesting part 211 and a usage deciding part 212. The input unit 23 includes an input receiving part 230 and an input device list 232.

The beacon receiving unit 24 receives list information on output devices, which the information processing can use, from the output hub apparatus 4 before the information processing is carried out in the dynamic device allocation system 100. After selecting the output device 54, which is connected with the output hub apparatus 4, from the list information on the available output device, the usage reservation requesting part 210 sets the selected output device 54 to "reservation state" and registers the setting with the output hub list 22. At this point of time, the usage reservation requesting part 210 registers the remote resource 3 or the networking client 7 in association with the output device 54. The usage reservation requesting part 210 notifies the output hub apparatus 4 of having reserved the output device 54.

The mapping requesting part 211 sends the base information, which is used when generating the above-mentioned device allocation information on the information processing, to the dynamic device allocation apparatus 1. After receiving the information processing instruction information from the dynamic device allocation apparatus 1, the usage deciding part 212 updates a state of the output device 54, which is registered with the output hub list 22, from 'reservation state' to 'in use'.

After the information processing is started in the dynamic device allocation system 100, the input receiving part 230 receives input information from the input device 52. The input receiving part 230 sends the input information, which is received from the input device 52, to the remote resource 3 or the networking client 7 on the basis of the output hub list 22.

The output hub apparatus 4 controls outputting information to each output device such as the output device 54. The output hub apparatus 4 includes an output hub agent 41, an input hub list 42, an output unit 43 and a beacon sending unit 44. The output hub agent 41 includes a usage reservation receiving part 410, a beacon stopping part 411 and a usage deciding part 412. The output unit 43 includes an output receiving part 430 and an output device list 432.

The beacon sending unit 44 sends list information on an output device, which is in an unused state, to the input hub apparatus 2 before the information processing is carried out in the dynamic device allocation system 100. The usage reservation receiving part 410 is notified by the input hub apparatus 2 of having reserved the output device 54. Afterward, the usage reservation receiving part 410 sets the input device 52, which inputs the input information into the information processing and which is connected with the input hub apparatus 2, to 'reservation state', and registers the setting with the input hub list 42. At this point of time, the usage reservation requesting part 210 registers the output device 54 in association with the input device 52. The usage reservation receiving part 410 stops an operation of the beacon sending unit 44 by use of the beacon stopping part 411, and hereinafter does not notify the input hub apparatus 2 of the list information on the output device which is in the unused state. After receiving the information processing instruction information from the dynamic device allocation apparatus 1, the usage deciding part 212 updates a state of the input device 52, which is registered with the input hub list 42, from 'reservation state' to 'in use'.

After the information processing is started in the dynamic device allocation system 100, the output receiving part 430 receives information, to which information processing is carried out, from the remote resource 3 or the networking client 7. The output receiving part 430 sends the information, to which the information processing is carried out, to the output device 54 on the basis of the input hub list 42.

The remote resource 3 is a resource which includes an information processing apparatus or the like and carries out various information processing. For example, the remote resource 3 is corresponding to a server apparatus in the thin client system. The remote resource 3 includes a remote resource agent 31, a virtual controller 32, a virtual view 34 and an existing system 53. The remote resource agent 31 includes a registration receiving part 310. The virtual controller 32 includes an input data converting part 320. The virtual view 34 includes output data 340.

Before the information processing is carried out in the dynamic device allocation system 100, the registration receiving part 310 acquires device specification information on the input device 52 and device specification information on the output device 54 from the input device list 232 and the output device list 432 respectively. The input device 52 and the output device 54 are designated by the information processing instruction information which is received from the dynamic device allocation apparatus 1. The registration receiving part 310 inputs the acquired device specification information on the input device 52, and the acquired device specification information on the output device 54 to the input data converting part 320 and the output data converting part 340 respectively.

After the information processing is started in the dynamic device allocation system 100, the input data converting part 320 converts the input information, which is received from the input hub apparatus 2, into a form, which the existing system 53 can process, on the basis of the device specification information. The input data converting part 320 inputs the converted input information into the existing system 53. The output data converting unit 340 converts information, which is processed by the existing system 53, into a form, which the output device 54 can process, on the basis of the device specification information, and afterward inputs the converted information into the output hub apparatus 4.

The networking client 7 is a resource which carries out an information processing. For example, the networking client 7 is corresponding to CPU (Central Processing Unit) of a thin client terminal apparatus in the thin client system. After the information processing is started in the dynamic device allocation system 100, the networking client 7 processes the input information, which is received from the input hub apparatus 2, according to the information processing instruction information which is received from the dynamic device allocation apparatus 1. The networking client 7 inputs a result of the information processing into the output hub device 4.

Figure 3A:
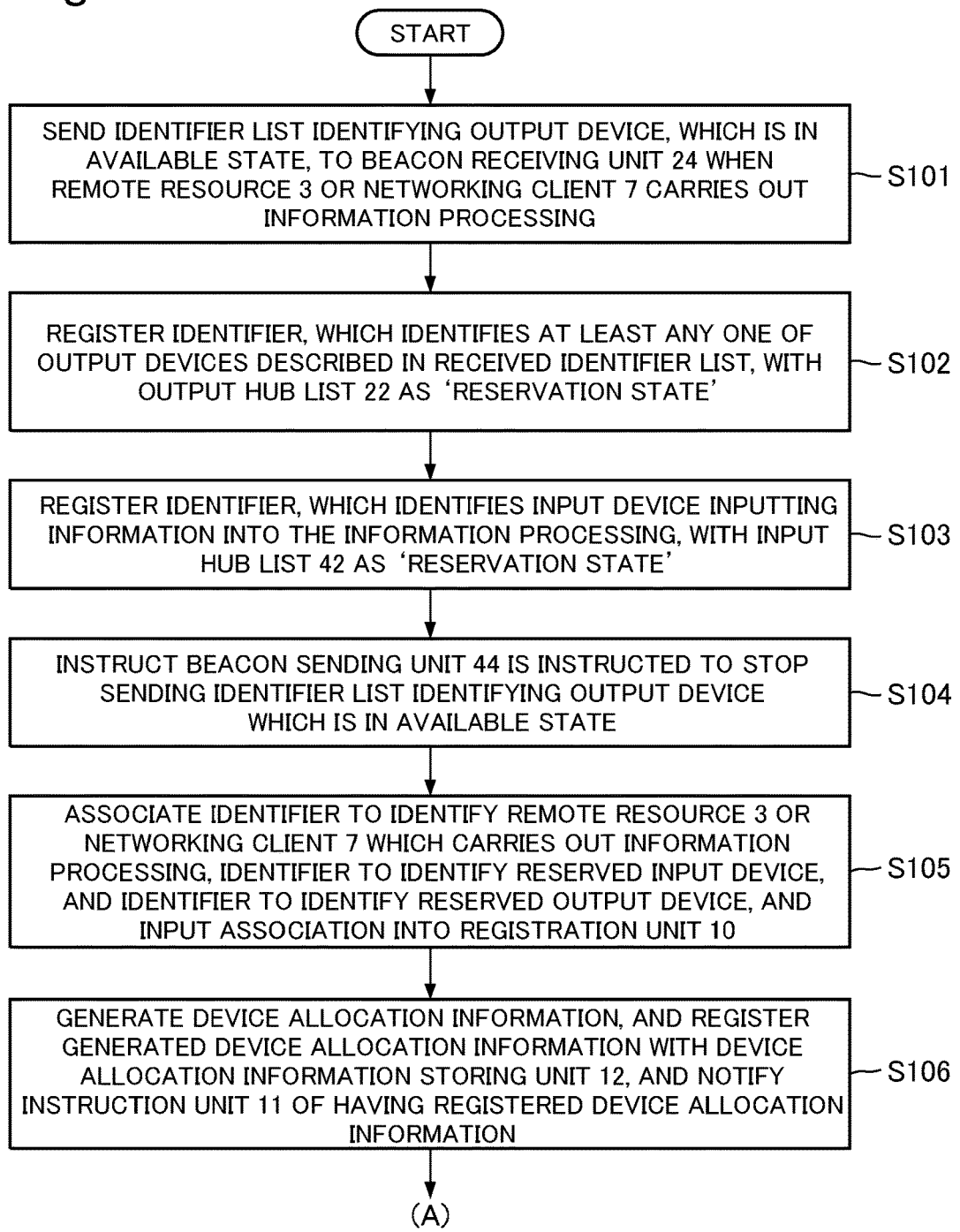
FIG. 3A is a flowchart (1/2) showing a device registration operation of the dynamic device allocation system according to the first exemplary embodiment of the invention of the present application.

Next, with reference to flow charts shown in FIG. 3A to 3B, a device registration operation (process) carried out by the dynamic device allocation system 100 of the exemplary embodiment will be described in detail.

When the remote resource 3 or the networking client 7 carries out information processing, the beacon sending unit 44 sends an identifier list identifying an output device, which is in an available state, out of the output devices such as the output device 54 to the beacon receiving unit 24 (Step 101).

The usage reservation requesting part 210 selects at least any one of the output devices from the identifier list which the beacon receiving unit 24 receives, and reserves to use the selected output device. Then, the usage reservation requesting part 210 registers an identifier, which identifies the output device, with the output hub list 22 as 'reservation state', and inputs the registered identifier into the usage reservation receiving part 410 (Step S102).

On the basis of the information which is inputted from the usage reservation requesting part 210, the usage reservation receiving part 410 registers an identifier, which identifies the input device inputting information into the information processing, with the input hub list 42 as 'reservation state' (Step S103). On the basis of the information which is inputted from the usage reservation requesting part 210, the usage reservation receiving part 410 instructs the beacon sending unit 44 to stop sending the identifier list, which identifies the output device which is in the available state, by use of the beacon stopping part 411 (Step S104).

The mapping requesting part 211 associates the identifier which identifies the remote resource 3 or the networking client 7 carrying out the information processing, the identifier which identifies the reserved input device, and the identifier which identifies the reserved output device, and inputs the association into the registration unit 10 (Step S105). The registration unit 10 generates the device allocation information on the basis of the information which is inputted from the mapping requesting part 211, and registers the generated device allocation information with the device allocation information storing unit 12, and notifies the instruction unit 11 of having registered the device allocation information (Step S106).

The instruction unit 11 reads the device allocation information from the device allocation information storing unit 12, and generates the information processing instruction information, which instructs to carry out the information processing, on the basis of the device allocation information. The instruction unit 11 inputs the generated information processing instruction information into the usage deciding part 212, the usage deciding part 412, and the registration receiving part 310 or the networking client 7 (Step S107). The usage deciding part 212 updates the state, which is an attribute of the identifier identifying the output device designated by the received information processing instruction information and which is registered with the output hub list 22, from 'reservation state' to 'in use' (Step S108).

The usage deciding part 412 updates the state, which is an attribute of the identifier identifying the input device designated by the received information processing instruction information and which is registered with the input hub list 42, from 'reservation state' to 'in use' (Step S109). The registration receiving part 210 acquires specification information on the input device, which the information processing instruction information designates, from the input device list 232, and acquires specification information on the output device, which the information processing instruction information designates, from the output device list 432 (Step S110). The registration receiving part 210 inputs the acquired specification information on the input device into the input data converting part 320, and inputs the acquired specification information on the output device into the output data converting part 340 (Step S111), and a whole of process is completed.

Next, with reference to a flowchart shown in FIG. 4, a device usage operation (process) of the dynamic device allocation system 100 of the exemplary embodiment will be described in detail. Here, the flowchart shows an operation which is carried out when the input device 52 and the output device 54 are allocated as the input device and the output device related to the information processing respectively.

The input receiving part 230 acquires the input information from the input device 52 which is in the state of 'in use' (Step S201). In the case that an execution subject, which is designated by the information processing instruction information and which carries out the information processing, is not the remote resource 3 (that is, execution subject is the networking client 7) (No in Step S202), the networking client 7 acquires the input information from the input receiving part 230. The networking client 7 inputs information processing output information, which is a result of the information processing, into the output receiving part 430 as the output information (Step S203), and the process advances towards Step S207.

In the case that the execution subject, which is designated by the information processing instruction information and which carries out the information processing, is the remote resource 3 (Yes in Step S202), the input data converting part 320 acquires the input information from the input receiving part 230. The input data converting part 320 converts the input information to generate information processing input information, and inputs the generated information processing input information into the existing system 53 (Step S204). The existing system 53 generates the information processing output information, which is a result of the information processing carried out to the information processing input information, and inputs the generated information processing output information into the output data converting part 340 (Step S205). The output data converting part 340 converts the information processing output information to generate the output information, and inputs the output information to the output receiving part 430 (Step S206). The output receiving part 430 inputs the output information into the output device 54, which is in the state of 'in use' (Step S207), and a whole of process is completed.

The dynamic device allocation system 100 according to the exemplary embodiment can allocate dynamically and flexibly the I/O device, which inputs and outputs the information related to the information processing, to the information processing carried out in the system. The reason is that the dynamic device allocation apparatus 1, the execution subject, the input device and the output device operate as follows. That is, on the basis of the device allocation information which associates the identifier of the execution subject carrying out the information process, the identifier of the input device, and the identifier of the output device, the dynamic device allocation apparatus 1 instructs the execution subject, the input device and the output device to carry out the information processing. Then, the execution subject, the input device and the output device carry out the information processing according to contents of the instruction issued by the dynamic device allocation apparatus 1.

Figure 27:
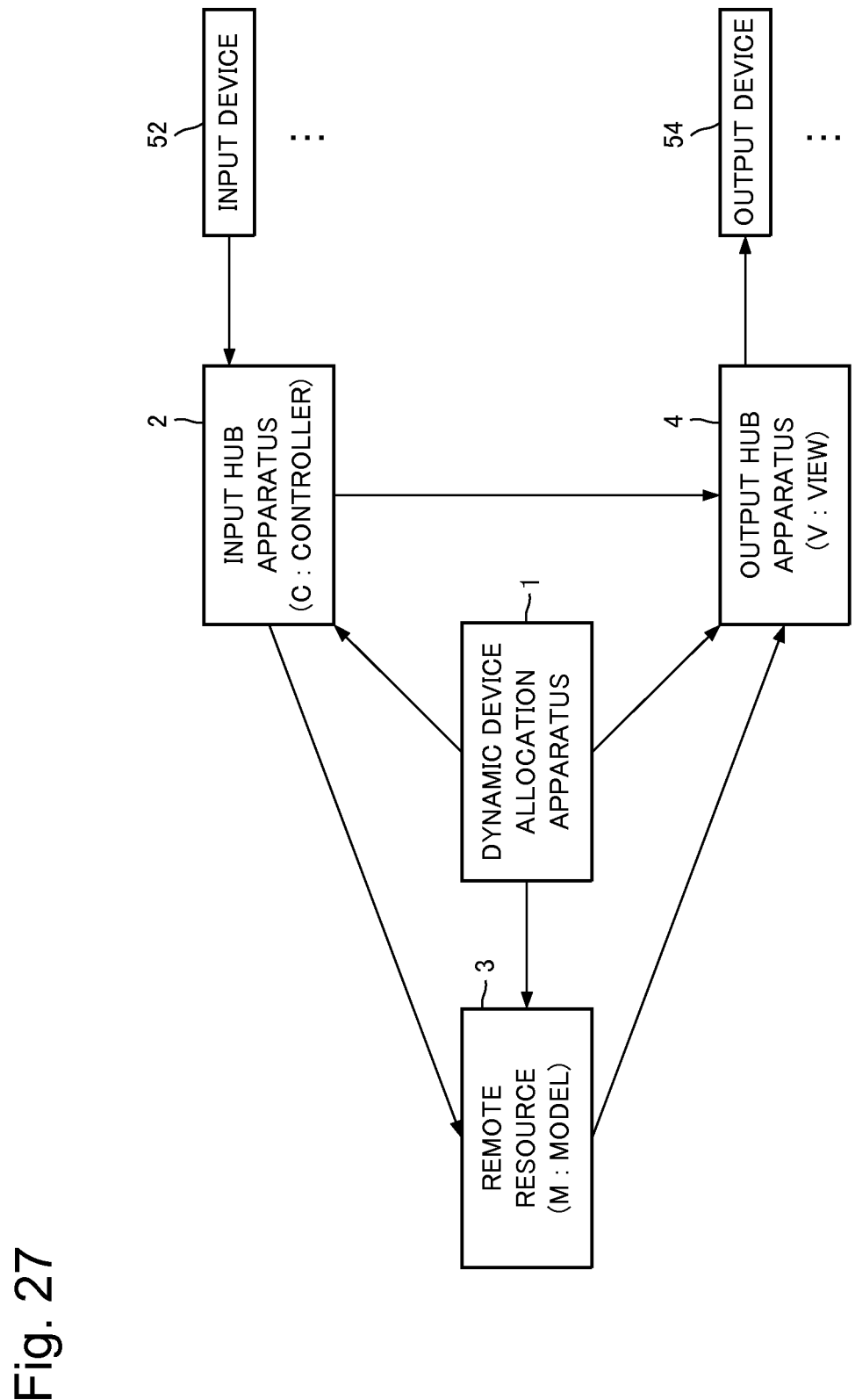
FIG. 27 is a diagram expressing the first exemplary embodiment of the invention of the present application by use of the MVC model.

FIG. 27 is a diagram expressing the exemplary embodiment by use of the MVC (Model-View-Controller) model which is known as the design model related to software.

The MVC model is a design model which expresses a system by use of a combination of three components, that is, 'model' which is a core of information processing, 'view' which processes an output, and 'controller' which controls 'model' and 'view' according to contents of a received input. According to the exemplary embodiment, the remote resource 3 is corresponding to 'model', and the output hub apparatus 4 is corresponding to 'view', and the input hub apparatus 2 is corresponding to 'controller'. The dynamic device allocation apparatus 1 according to the exemplary embodiment associates 'model', 'view' and 'controller' per the information processing, and afterward instructs 'model', 'view' and 'controller' to carry out the information processing. Accordingly, the dynamic device allocation system 100 can construct dynamically and flexibly a flow, which is related to the information processing, per the information processing. The flow related to the information processing is a flow in which information inputted by any one of the input devices is processed by any one of the information processing apparatuses, and a result of the information processing is outputted to any one of the output devices.

For example, in the case of the general thin client environment, a server apparatus is corresponding to 'model', and a thin client terminal apparatus is corresponding to 'controller' and 'view'. In detail, an input control unit which controls an information input from a keyboard and a mouse of the thin client terminal apparatus is corresponding to 'controller', and an output control unit which controls an information output provided to a display is corresponding to 'view'. Here, CPU (not shown in the MVC model shown in FIG. 27) which operates the thin client terminal apparatus is corresponding to the networking client 7 shown in FIG. 1.

A flow related to the general information processing in the thin client environment is 'controller'→'model'→'view'. However, for example, in the case of an information processing to make a display released from the power saving mode by an user's operating a mouse, an amount of communication traffic can be reduced in the case of carrying out a process according to a flow of 'controller'→'view' in comparison with an amount of communication traffic in the case of carrying out a process according to the flow of 'controller'→'model'→'view'. As a result, it is expected to improve responsiveness in an environment that a communication network has a narrow bandwidth or the like. The dynamic device allocation system 100 according to the exemplary embodiment can construct dynamically and flexibly the flow of 'controller'→'model'→'view' or 'controller'→'view'.

Without depending on the physical configuration related to the system, the dynamic device allocation system 100 associates the input device, the information processing apparatus and the output device. For example, even in the case that the input device and the output device do not exist in one apparatus like the thin client terminal apparatus, and that each of the input device and the output device exists independently as one apparatus, the dynamic device allocation system 100 can carry out the association mentioned above. Accordingly, in order to improve fault tolerance, and convenience related to a system change, the dynamic device allocation system 100 can construct flexibly a system which distributes the information processing apparatus and the I/O device.

According to the exemplary embodiment, the remote resource 3 acquires the device specification information on the input device and the device specification information on the output device from the input hub apparatus 2 and the output hub apparatus 4 respectively when carrying out the information processing, and converts a data form on the basis of the device specification information. Accordingly, the dynamic device allocation system 100 can cope with an I/O device, which includes a special interface, flexibly.

In the case that the information processing includes a plurality of partial information processing, the registration unit 10 of the dynamic device allocation apparatus 1 may generate device allocation information associating the information processing apparatus and the I/O device whose combination is different per the partial information processing, and register the generated device allocation information with the device allocation information storing unit 12. Since information, which is processed per the partial information processing, passes through the different information processing apparatus and the different I/O device in this case, the dynamic device allocation system 100 can secure the responsiveness which satisfies a predetermined level even in the environment that the communication network has a narrow bandwidth. Moreover, when a fault is caused in the system, the dynamic device allocation system 100 associates the information processing apparatus and the I/O device with avoiding a location suffering from the fault, and consequently, the dynamic device allocation system 100 can carry out the system operation free from the fault.

First Modification of the First Exemplary Embodiment

There is a case that the dynamic device allocation system according to the exemplary embodiment mentioned above carries out a process related to a window manager including an input terminal and an output terminal, each of which operates a remote computer, as a first modification described in the following. The first modification is corresponding to a case that functions of the thin client terminal are separated into two of a function dedicated to an input, and a function dedicated to an output.

Figure 5:
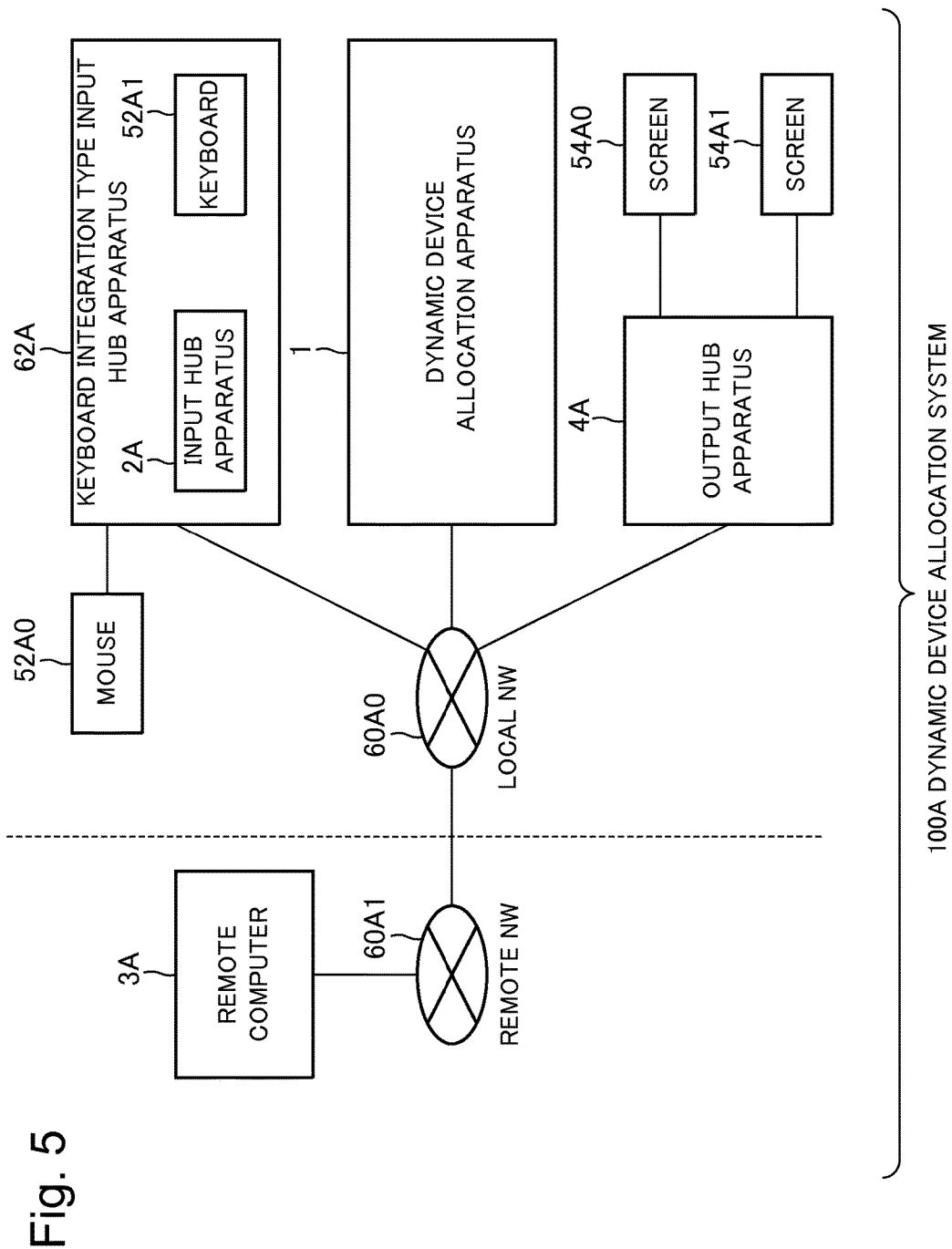
FIG. 5 is a block diagram showing a physical configuration of a first modification of the dynamic device allocation system according to the first exemplary embodiment of the invention of the present application.
Figure 6:
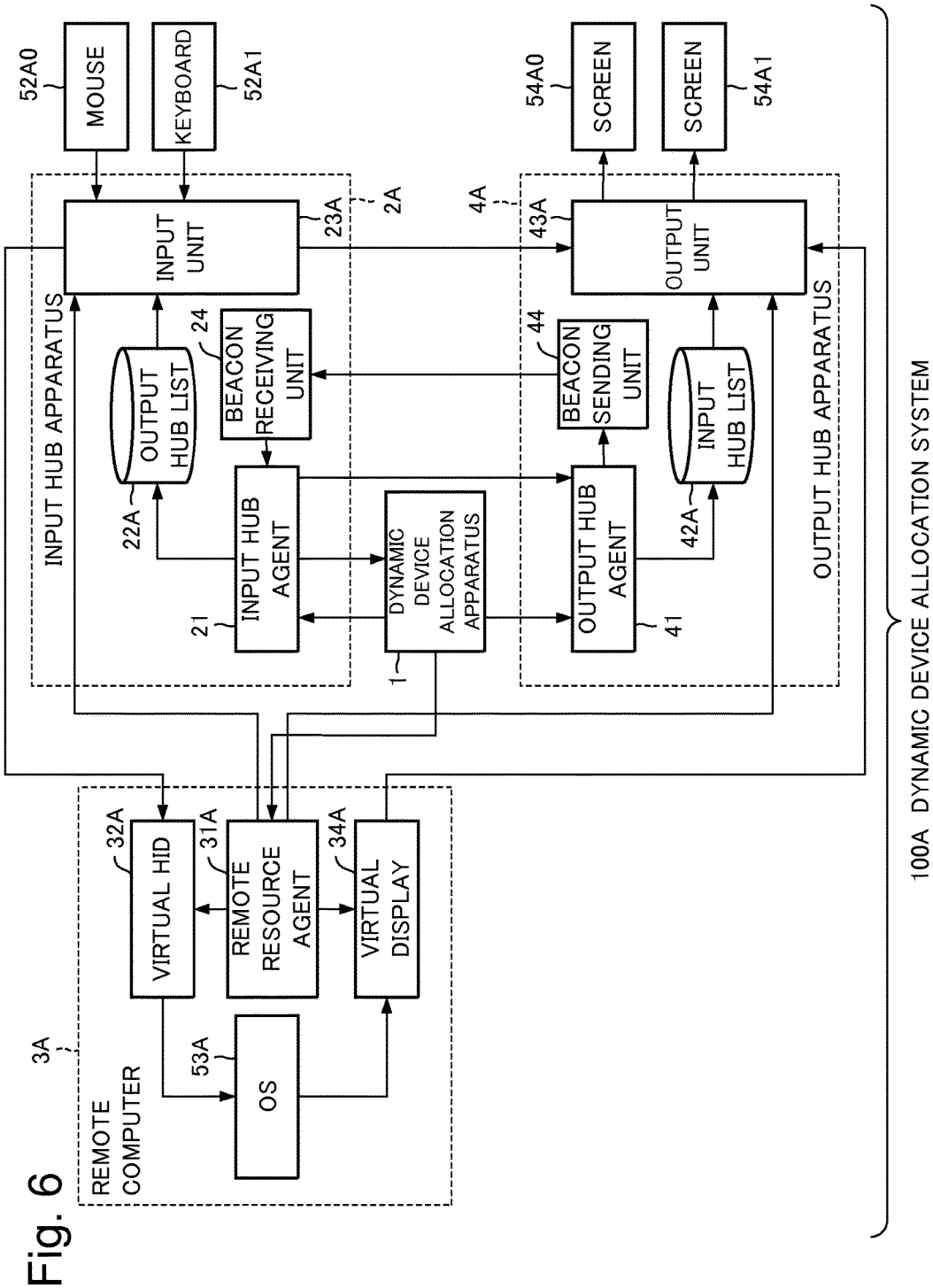
FIG. 6 is a block diagram showing an outline of a logical configuration of the first modification of the dynamic device allocation system according to the first exemplary embodiment of the invention of the present application.
Figure 7:
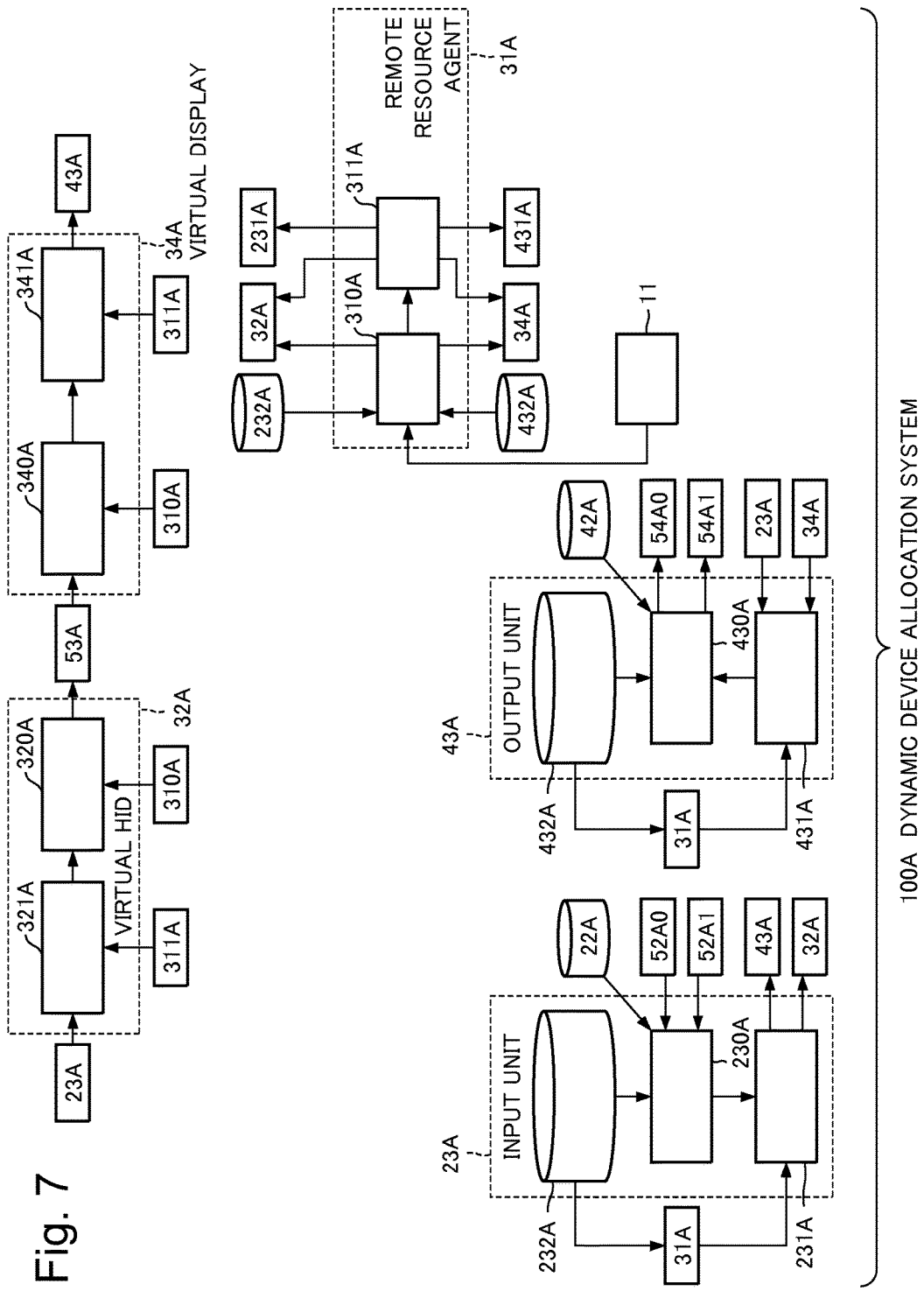
FIG. 7 is a block diagram showing details of the logical configuration of the first modification of the dynamic device allocation system according to the first exemplary embodiment of the invention of the present application.

FIG. 5 is a conceptual block diagram showing a physical configuration of a dynamic device allocation system 100A according to the modification. FIG. 6 is a conceptual block diagram showing an outline of a logical configuration of the dynamic device allocation system 100A according to the modification. FIG. 7 is a conceptual block diagram showing details of the logical configuration of the dynamic device allocation system 100A according to the modification.

As shown in FIG. 5, a remote computer 3A is connected with a remote NW (network) 60A1. The following three apparatuses are connected with a local NW 60A0. The first apparatus is the dynamic device allocation apparatus 1 mentioned above. The dynamic device allocation apparatus 1 exists at a location which is on a local NW and with which a user does not contact directly like a floor LAN (Local Area Network).

The second apparatus is a keyboard integration type input hub apparatus 62A which includes a keyboard 52A1 and an input hub apparatus 2A. A function of the input hub apparatus 2A is similar to the function of the input hub apparatus 2 mentioned above. The keyboard integration type input hub apparatus 62A includes a connector, which connects with a mouse 52A0, such as a PS/2 mouse port.

The third apparatus is an output hub apparatus 4A, and its function is similar to the function of the output hub apparatus 4 mentioned above. The output hub device 4A includes two connectors, which connect with a screen 54A0 and a screen 54 A1, such as a D-SUB 15 ports.

Each of these three apparatuses includes a network port, which connects with the local NW 60A0, such as RJ-45, and furthermore includes CPU, a memory and a system bus which realize a computing ability. However, each of these apparatuses does not include a disc area which stores user data, and stores management data, which needs to be stored during an operation, in a memory. Here, it is assumed that a program which operates the above-mentioned apparatus is stored in a non-volatile memory and is not updated.

As shown in FIG. 6, the configuration of the dynamic device allocation system 100A is almost similar to the configuration of the dynamic device allocation system 100 shown in FIG. 1. On an assumption of operating the remote computer 3A, the dynamic device allocation system 100A uses a virtual HID (Human Interface Device) 32A as the virtual controller 32 shown in FIG. 1, and uses a virtual display 34A as the virtual view shown in FIG. 1. Here, it is assumed that either of the input hub apparatus 2A and the output hub apparatus 4A has functions of the networking client 7 shown in FIG. 1 or both of the input hub apparatus 2A and the output hub apparatus 4A share the functions of the networking client 7.

As shown in FIG. 7, a common key generating part 311A of a remote resource agent 31A generates a common key related to a common key encryption process. An input encrypting part 231A of an input unit 23A, an output decoding part 431A of an output unit 43A, an input decoding part 321A of the virtual HID 32A and an output encrypting part 341A of the virtual display 34A store the common key. After a process, which is carried out in a registration receiving part 310A is completed, to generate the common key is carried out. The common key is delivered by use of a public key which is related to each node (apparatus). The dynamic device allocation apparatus 1 does not store the common key. The remote resource agent 31A of the remote computer 3A constructs a trust relation between local devices by use of the input hub apparatus 2A and the output hub apparatus 4A. For example, in the case of Bluetooth (registered trademark), device authentication is based on the client server method. Meanwhile, device authentication according to the modification is realized in the remote environment. Hereinafter, according to the present application, the trust relation constructing method is called a remote pairing. The modification realizes the remote pairing which uses a common key.

Next, an operation (process) of the dynamic device allocation system 100A of the modification will be described.

It is assumed, as an initial state, that the screen 54A0 displays a predetermined character string, for example, a character string of 'Hello', and that an operating object, to which operating has been carried out just before, in an input receiving part 230A is the output hub apparatus 4A out of the remote computer 3A and the output hub apparatus 4A. Moreover, it is assumed that the output hub apparatus 4A does not receive information which is inputted from the keyboard 52A1, and that a whole of information inputted from the keyboard 52A1 is sent to the remote computer 3A. Moreover, an output receiving part 430A sets only the screen 54A0 to display information which is outputted from the remote computer 3A.

When a character 'A' is inputted from the keyboard 52A1 in this case, the input receiving part 230A checks that a sending destination of information associated with the keyboard 52A1 is only the remote computer 3A as shown in an input device list 232A. Then, the input receiving part 230A sends the encrypted 'A' to the remote computer 3A. The remote computer 3A carries out a character input processing, and consequently, display on the screen 54A0 is changed to 'HelloA'.

Meanwhile, when a coordinate is inputted through dragging by use of the mouse 52A0, the input receiving part 230A checks that sending destinations of information associated with the mouse 52A0 are two of the remote computer 3A and the output hub apparatus 4A as shown in the input device list 232A. Since the operating object to which operating has been carried out just before is the output hub apparatus 4A, the input receiving part 230A sends encrypted coordinate information to the output hub apparatus 4A. The output receiving part 430A inputs new coordinate information, which indicates a coordinate for displaying information outputted from the remote computer 3A, into the screen 54A0 or the screen 54 A1. In the case that the new coordinate information indicates a coordinate on the screen 54A1, the screen 54A1 displays 'Hello'. That is, in this case, 'Hello' shown on the screen 54A0 is moved to the screen 54A1.

The dynamic device allocation system 100A according to the modification can allocate the I/O device, which inputs and outputs information related to information processing carried out in the system, dynamically and flexibly to the information processing. The reason is that the dynamic device allocation apparatus 1, the execution subject, the input device and the output device operate as follows. That is, on the basis of the device allocation information which associates the identifier of the execution subject carrying out the information process, the identifier of the input device, and the identifier of the output device, the dynamic device allocation apparatus 1 instructs the execution subject, the input device and the output device to carry out the information processing. Then, the execution subject, the input device and the output device carry out the information processing according to contents of the instruction which is issued by the dynamic device allocation apparatus 1.

The dynamic device allocation system 100A may secure two different communication bandwidths which are used for the input into the remote computer 3A and for the output from the remote computer 3A. For example, with respect to an input, the dynamic device allocation system 100A may communicate based on TCP which requires reversible compression and is quite reliable, and with respect to an output, the dynamic device allocation system 100A may communicate based on UDP which permits to be irreversible.

By using that the input device and the output device are arranged separately, the dynamic device allocation system 100A changes the output hub apparatuses when the output hub apparatus 4A is caused a fault, and afterward by carrying out the remote pairing, the dynamic device allocation system 100A can continue to carry out the processing with maintaining to be in a login state and in a connection state. Here, in the case that the input device and the output device exist in the same terminal apparatus, it is necessary usually for the dynamic device distribution system 100A to disconnect the login state once when exchanging the output hub apparatuses.

Also when adding an output device such as a screen, by carrying out the remote pairing after connecting the screen with the output hub, the dynamic device allocation system 100A can make the remote computer 3A recognize the added screen with maintaining connection with the remote computer 3A. That is, the dynamic device allocation system 100A can carry out an operation, which is corresponding to the hot plug, to the I/O device.

By encrypting information sent and received among the input hub apparatus 2A, the output hub apparatus 4A and the remote computer 3A, the dynamic device allocation system 100A can make the security vulnerability small. The remote computer 3A generates the common key which is used in the encryption processing, and sends the generated common key to the input hub apparatus 2A and the output hub apparatus 4A, and the input hub apparatus 2A and the output hub apparatus 4A use the received common key. That is, by reducing number of the common keys, the dynamic device allocation system 100A can carry out the efficient encryption process. Here, the dynamic device allocation system 100A may carry out the encryption process not to all sent and received information but only when being instructed to carry out the encryption process.

Second Modification of the First Exemplary Embodiment

There is a case that the remote resource in the dynamic device allocation system according to the exemplary embodiment mentioned above is a hypervisor, which realizes virtual machines, as a second modification described in the following.

Figure 8:
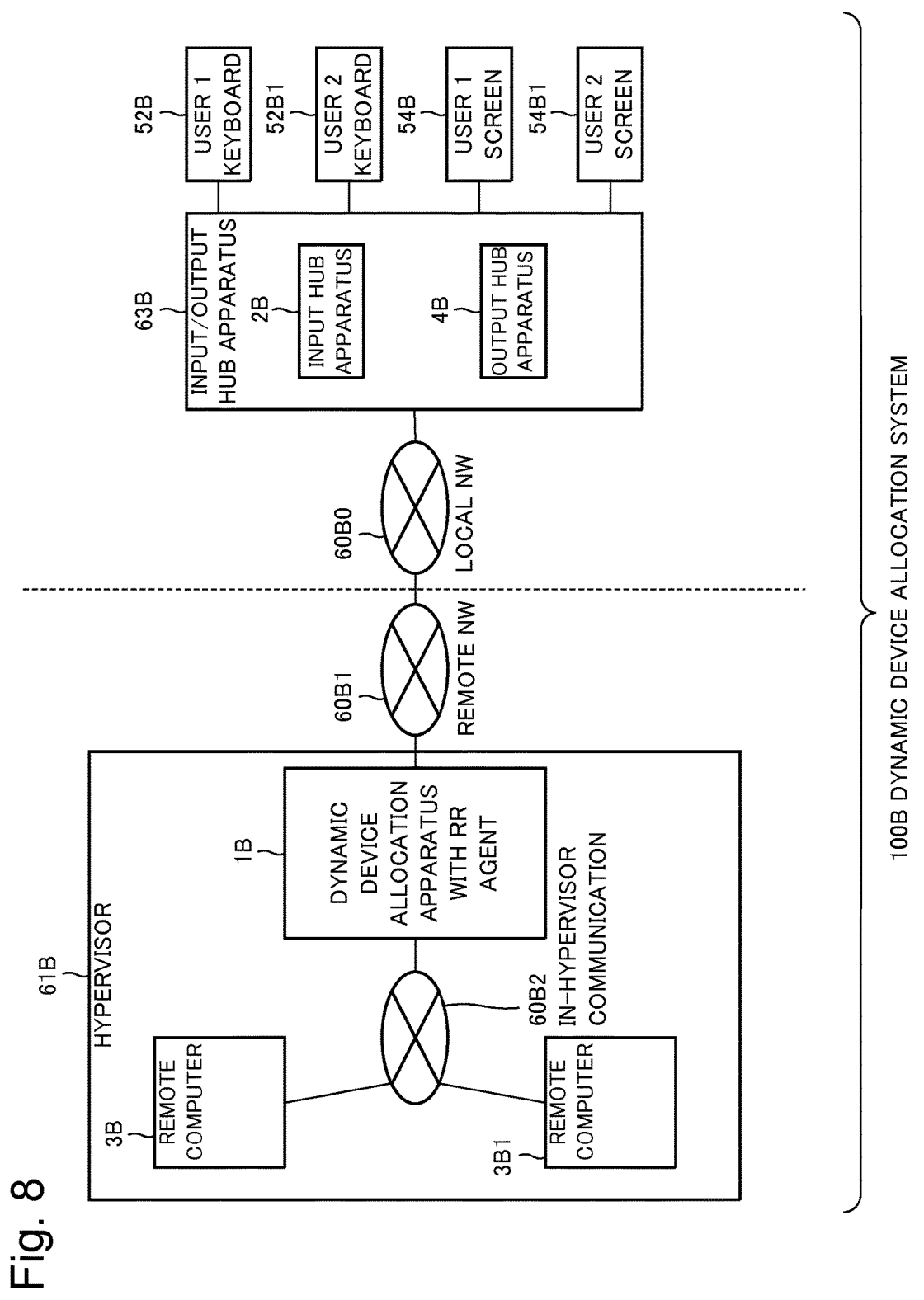
Figure 9:
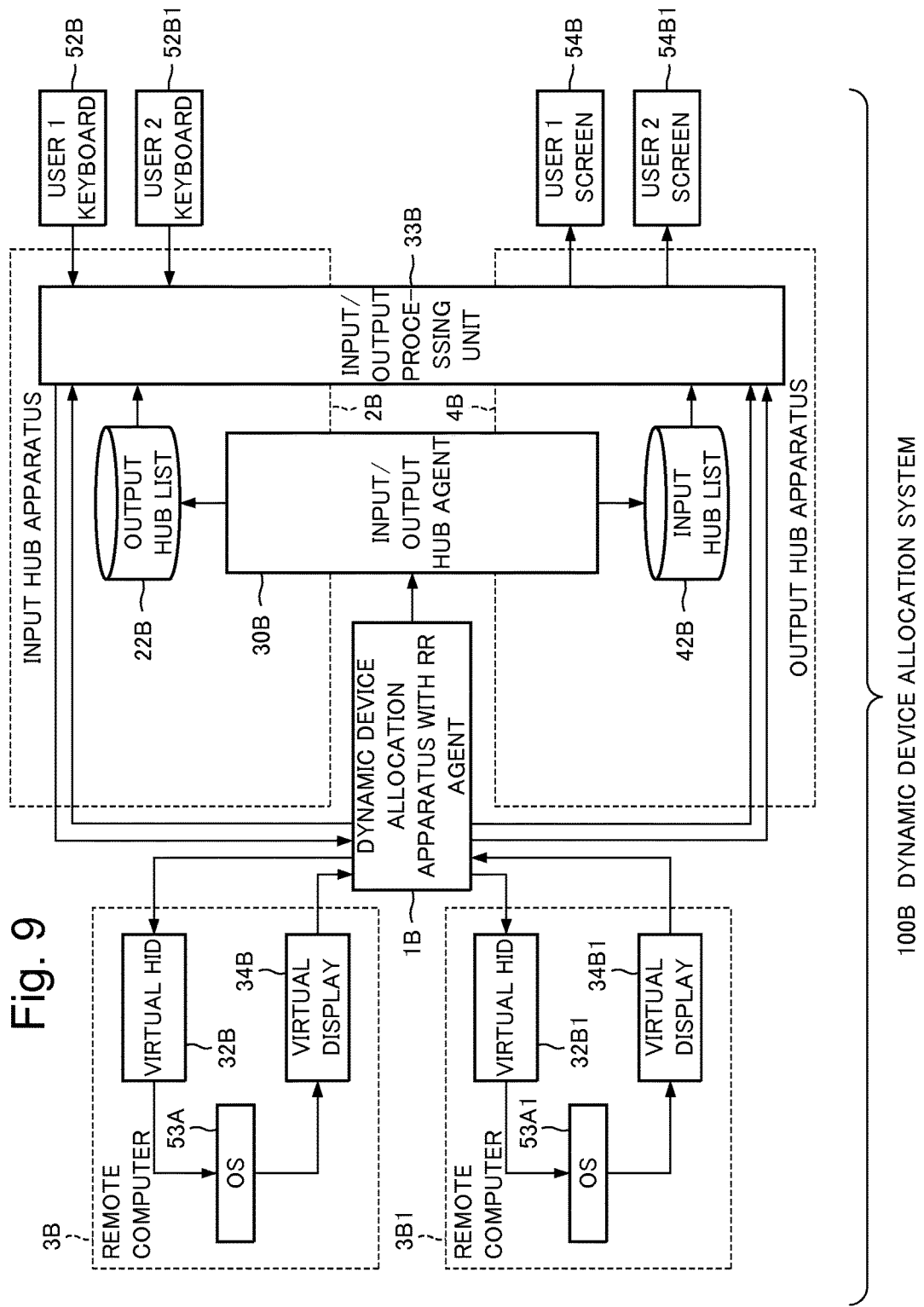
FIG. 9 is a block diagram showing an outline of a logical configuration of the second modification of the dynamic device allocation system according to the first exemplary embodiment of the invention of the present application.
Figure 10:
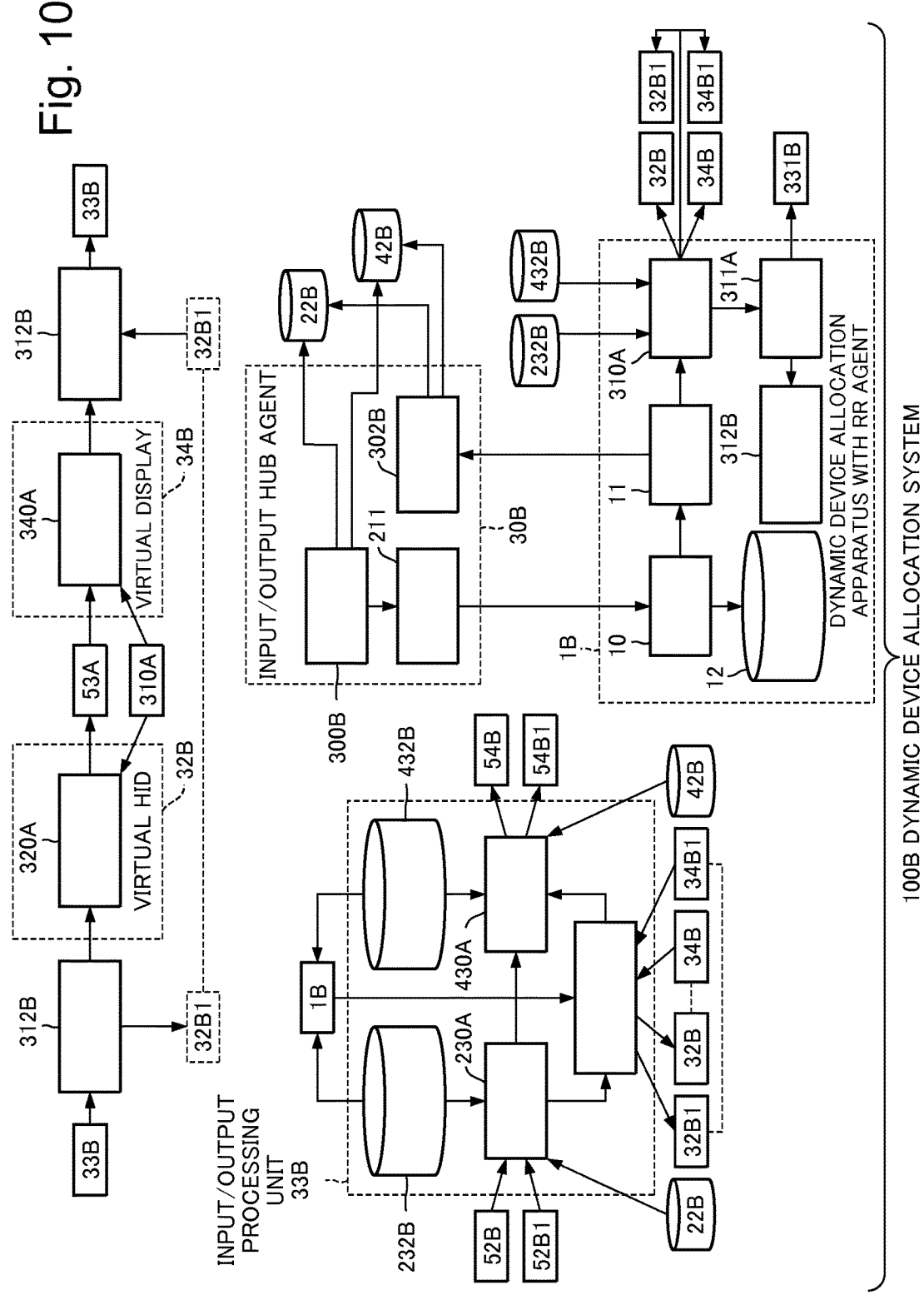
FIG. 10 is a block diagram showing details of the logical configuration of the second modification of the dynamic device allocation system according to the first exemplary embodiment of the invention of the present application.

FIG. 8 is a conceptual block diagram showing a physical configuration of a dynamic device allocation system 100B according to the modification. FIG. 9 is a conceptual block diagram showing an outline of a logical configuration of the dynamic device allocation system 100B according to the modification. FIG. 10 is a conceptual block diagram showing details of the logical configuration of the dynamic device allocation system 100B according to the modification.

The dynamic device allocation system 100B includes a hypervisor 61B which is connected with a remote NW 60B1 and an input/output hub apparatus 63B which is connected with a local NW 60B0. The hyper visor 61B includes a remote computer 3B, a remote computer 3B1 and a dynamic device allocation apparatus with RR (Remote Resource) agent 1B. The remote computer 3B, the remote computer 3B1 and the dynamic device allocation apparatus with RR agent 1B are connected each other by in-hypervisor communication 60 B2 so as to be able to communicate each other. The dynamic device allocation apparatus with RR agent 1B has functions which the dynamic device allocation apparatus 1 and the remote resource agent 31 in the first exemplary embodiment have.

The input/output hub apparatus 63B includes an input hub apparatus 2B and an output hub apparatus 4B. Moreover, the input/output hub apparatus 63B is connected with a user 1 keyboard 52B and a user 2 keyboard 52B1 which are input devices, and furthermore is connected with a user 1 screen 54B and a user 2 screen 54B1 which are output devices.

According to the modification, two blocks in the first exemplary embodiment shown in FIGS. 1 and 2 are integrated into one block. For example, the dynamic device allocation system 100B includes a usage reserving part 300B as a block to realize functions which are processed by the usage reservation requesting part 210 and the usage reservation receiving part 410 of the dynamic device allocation system 100. Moreover, the dynamic device allocation system 100B includes a usage deciding part 302B as a block to realize functions which are processed by the usage deciding part 212 and the usage deciding part 412 of the dynamic device allocation system 100. As a result, blocks such as the beacon sending unit 44, the beacon receiving unit 24 and the like, which the dynamic device allocation system 100 includes, are unnecessary in the modification.

The dynamic device allocation system 100B includes a client encryption processing part 331B formed by make key storing areas, which are related to the input encrypting part 231A and the output decoding part 431A of the dynamic device allocation system 100A according to the first modification, common. The dynamic device allocation system 100B includes a server encryption processing part 312B formed by making key storing areas, which are related to the input decoding unit 321A and the output encrypting part 341A, common. According to the modification, an output hub list 22B and an input hub list 42B store records of the remote computer which is in a used state.

The dynamic device allocation system 100B according to the modification can allocate the I/O device, which inputs and outputs information related to information processing carried out in the system, dynamically and flexibly to the information processing. The reason is that the dynamic device allocation apparatus with RR agent 1B, the execution subject, the input device and the output device operate as follows. That is, on the basis of the device allocation information which associates the identifier of the execution subject carrying out the information process, the identifier of the input device, and the identifier of the output device, the dynamic device allocation apparatus with RR agent 1B instructs the execution subject, the input device and the output device to carry out the information processing. Then, the execution subject, the input device and the output device carry out the information processing according to contents of the instruction which is issued by the dynamic device allocation apparatus with RR agent 1B.

By use of the usage reserving part 300B, the dynamic device allocation system 100B makes devices of the input hub apparatus 2B and the output hub apparatus 4B enter into a reservation state at the same time. Accordingly, the dynamic device allocation system 100B can avoid disconnection of communication in an operation for matching between the input hub apparatus 2B and the output hub apparatus 4B.

By integrating two blocks of the dynamic device allocation system 100 into one block, the dynamic device allocation system 100B can simplify the system configuration. By making the key storing areas common, especially, by holding not a common key related to all of the remote computers, but only a common key, which is related to a user who is using actually, in the hypervisor 61B, the dynamic device allocation system 100B can reduce the key storing area which is necessary for storing the common key. In the case that a user uses a plurality of remote computers in the same hypervisor, the dynamic device allocation system 100B can use the existing common key just as it is. In the case that a user uses the remote computers which are included in the hypervisors different each other, the dynamic device allocation system 100B can avoid generating a new common key by the dynamic device allocation apparatus with RR agent, which is included in each the hypervisor, sending and receiving the common key each other. Accordingly, the dynamic device allocation system 100B can avoid delivering the common key to an input/output processing unit 33B newly.

According to the modification, in the case that a user uses devices which are connected with the input/output hub apparatus 63B, the client encryption processing part 331B can secure the security related to the respective connections with the devices by managing the individual common keys of the user. Moreover, in the case that an user uses remote computers which work in the hypervisor 61B, the server encryption processing part 312B can secure the security related to each of the remote computers by managing the user's common keys which are different each other.

Third Modification of the First Exemplary Embodiment

There is a case that each of the input hub apparatus and the output hub apparatus in the dynamic device allocation system according to the exemplary embodiment mentioned above is a wireless device hub apparatus as a third modification described in the following.

Figure 11:
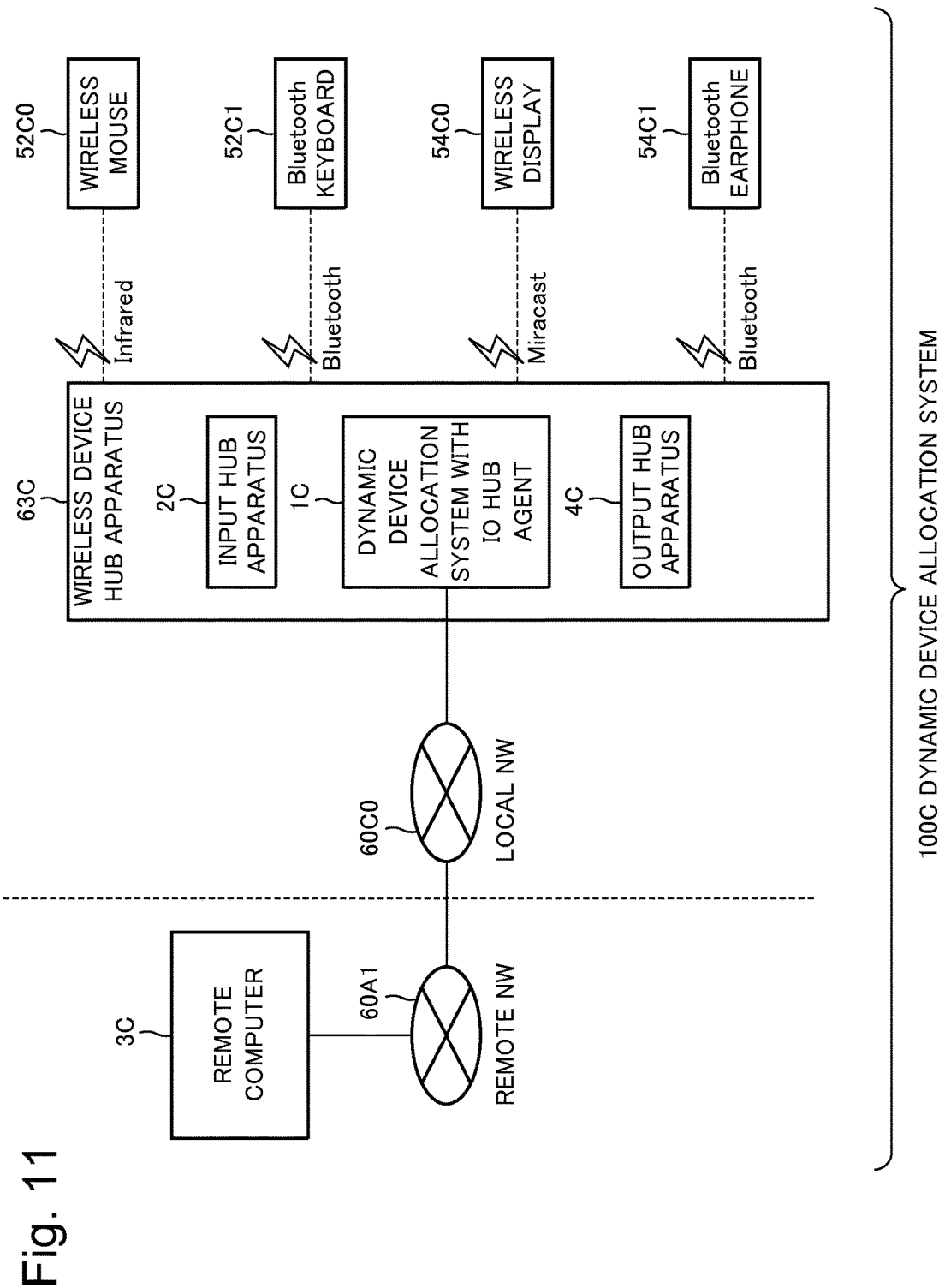
FIG. 11 is a block diagram showing a physical configuration of a third modification of the dynamic device allocation system according to the first exemplary embodiment of the invention of the present application.
Figure 12:
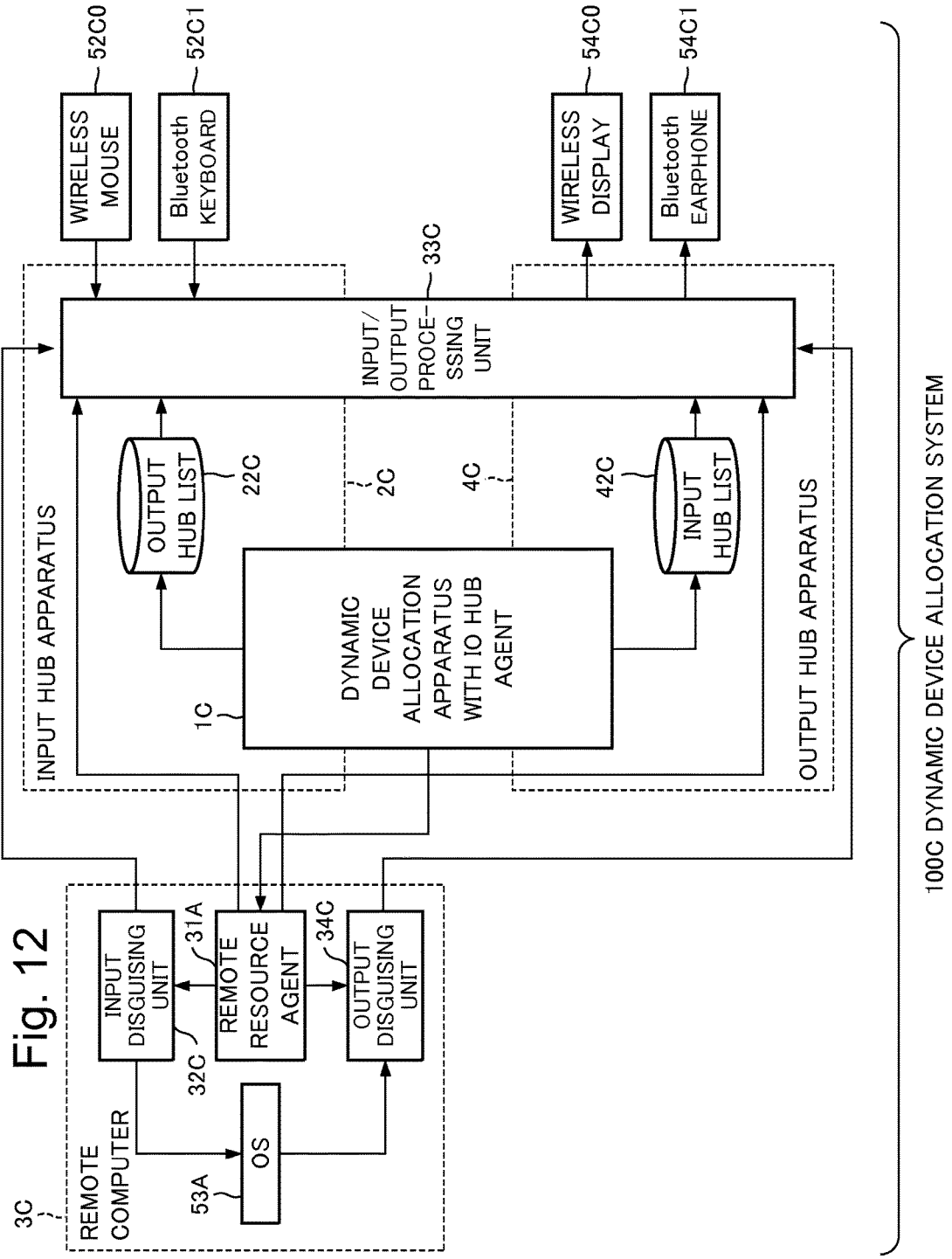
FIG. 12 is a block diagram showing an outline of a logical configuration of the third modification of the dynamic device allocation system according to the first exemplary embodiment of the invention of the present application.
Figure 13:
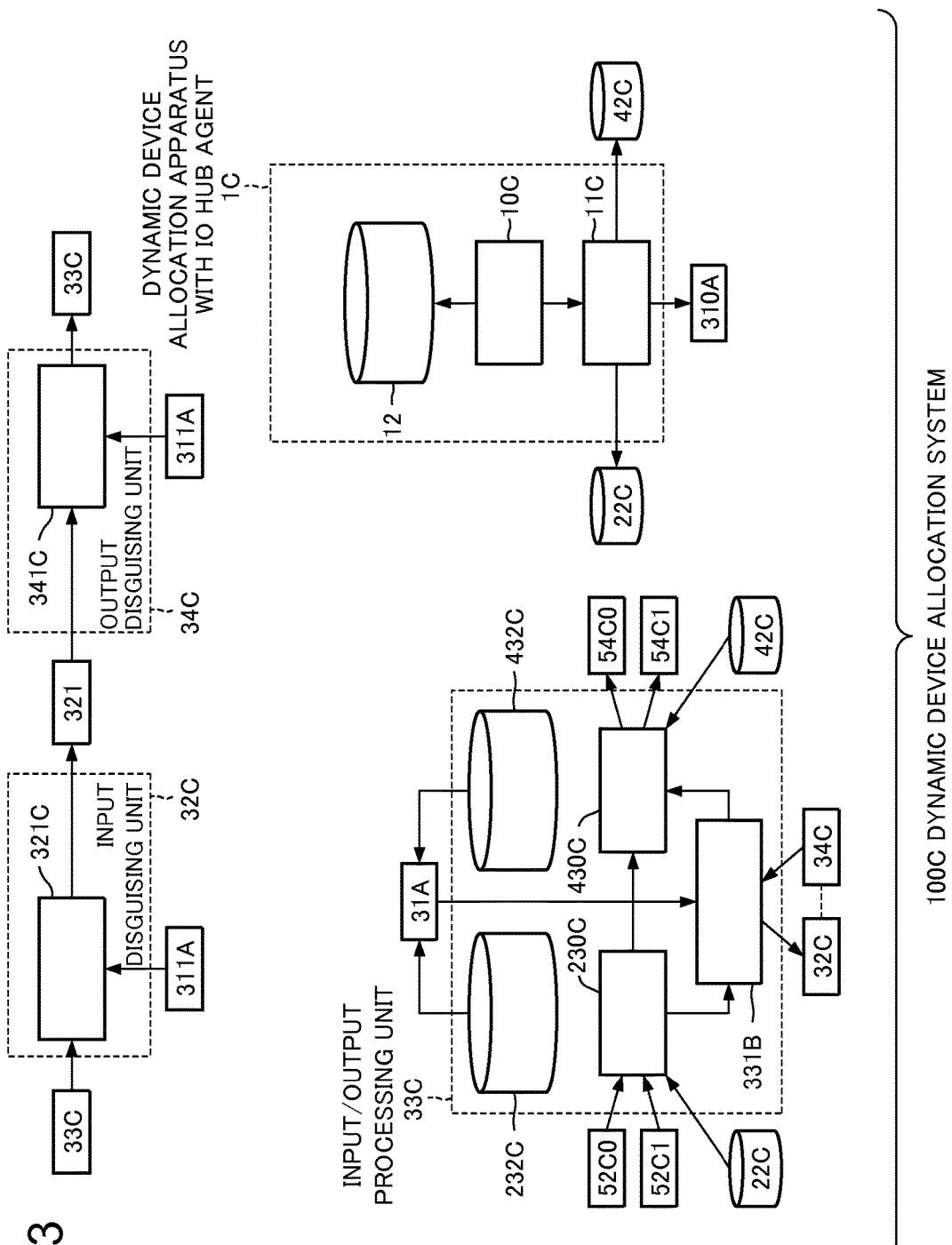
FIG. 13 is a block diagram showing details of the logical configuration of the third modification of the dynamic device allocation system according to the first exemplary embodiment of the invention of the present application.

FIG. 11 is a conceptual block diagram showing a physical configuration of a dynamic device allocation system 100C according to the modification. FIG. 12 is a conceptual block diagram showing an outline of a logical configuration of the dynamic device allocation system 100C according to the modification. FIG. 13 is a conceptual block diagram showing details of the logical configuration of the dynamic device allocation system 100C according to the modification.

The dynamic device allocation system 100C includes a remote computer which is connected with the remote NW 60A1 and a wireless device hub apparatus 63C which is connected with a local NW 6000. The wireless device hub apparatus 63C includes a dynamic device allocation apparatus with TO hub agent 1C, an input hub apparatus 2C and an output hub apparatus 4C. The dynamic device allocation apparatus with TO hub agent 1C has functions which the dynamic device allocation apparatus 1, the input hub agent 21 and the output hub agent 41 in the first exemplary embodiment have.

The wireless device hub apparatus 63C has a short distance device signal communication function by wireless, Bluetooth, or the like. The wireless device hub apparatus 63C is connected with a wireless mouse 52C0 and a Bluetooth keyboard 52C1 which are input devices, and is connected with a wireless display 54C0 and a Bluetooth earphone 54 C1 which are output devices. According to the dynamic device allocation system 100C, a local PC can input and output the short distance device signal by use of drivers included in the local PC. However, according to the dynamic device allocation system 100C, a remote computer 3C, which is connected with the remote NW 60A1, cannot input and output the device signal as it is.

The dynamic device allocation system 100C includes a mapping unit 10C which is corresponding to integration of the mapping requesting part 211 and the mapping receiving unit 10 of the dynamic device allocation system 100. As a result, according to the dynamic device allocation system 100C, a component such as the usage reservation requesting part 210 or the like in the dynamic device allocation system 100 is unnecessary. An input disguising unit 32C and an output disguising unit 34C carry out only an encryption processing, and do not carry out data conversion of the input and the output.

The dynamic device allocation system 100C according to the modification can allocate the I/O device, which inputs and outputs information related to information processing carried out in the system, dynamically and flexibly to the information processing. The reason is that the dynamic device allocation apparatus with TO hub agent 1C, the execution subject, the input device and the output device operate as follows. That is, on the basis of the device allocation information which associates the identifier of the execution subject carrying out the information process, the identifier of the input device, and the identifier of the output device, the dynamic device allocation apparatus with TO hub agent 1C instructs the execution subject, the input device and the output device to carry out the information processing. Then, the execution subject, the input device and the output device carry out the information processing according to contents of the instruction which is issued by the dynamic device allocation apparatus with TO hub agent 1C.

Since the dynamic device allocation system 100C omits the usage reservation processing which is related to the device, it is possible to make the remote computer 3 recognize the device at the same timing when making the wireless device hub apparatus 63C recognize the device. The dynamic device allocation system 100C encrypts or decrypts the short distance device signal in the wireless device hub apparatus 63C, and decrypts or encrypts in the remote computer 3C respectively. Accordingly, according to the dynamic device allocation system 100C, the remote computer 3C inputs and outputs the short distance device signal without data conversion. As a result, OS 53A in the remote computer 3C can handle the device, which is connected with the wireless device hub apparatus, like a device which is connected locally.

By a high speed processing due to not carrying out the data conversion to the short distance device signal, the dynamic device allocation system 100C can configure a device hub such as a base station, a switch or the like which carries out only two processes of real-time communication and the encryption processing according to the modification. Furthermore, since a communication infrastructure has no restriction, the modification is applicable to both of the existing network environment, and a network infrastructure in future.

Fourth Modification of the First Exemplary Embodiment

There is a case that the dynamic device allocation system according to the exemplary embodiment mentioned above is a system which shares a television (TV) screen as a fourth modification described in the following.

Figure 14:
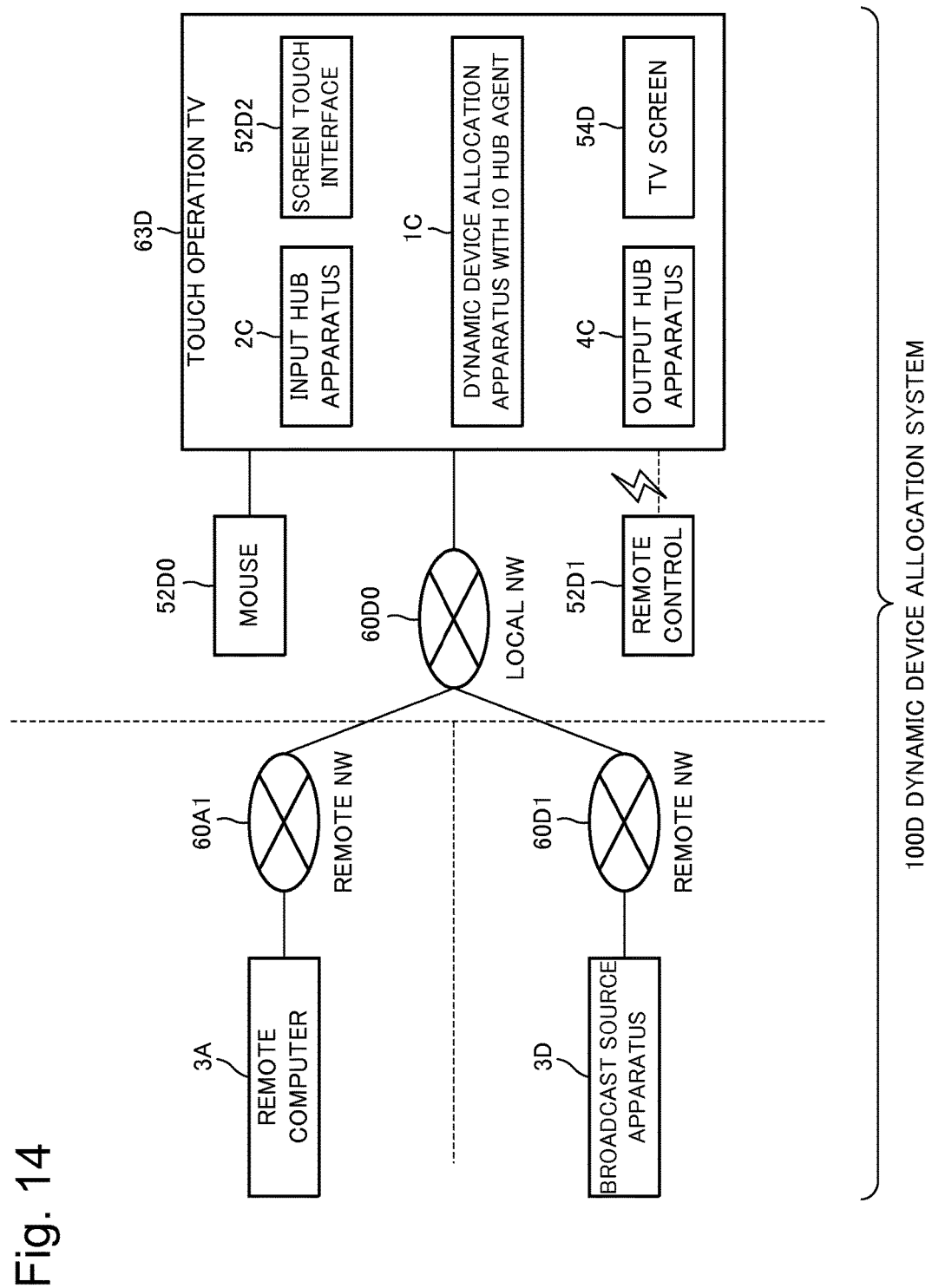
FIG. 14 is a block diagram showing a physical configuration of a fourth modification of the dynamic device allocation system according to the first exemplary embodiment of the invention of the present application.
Figure 15:
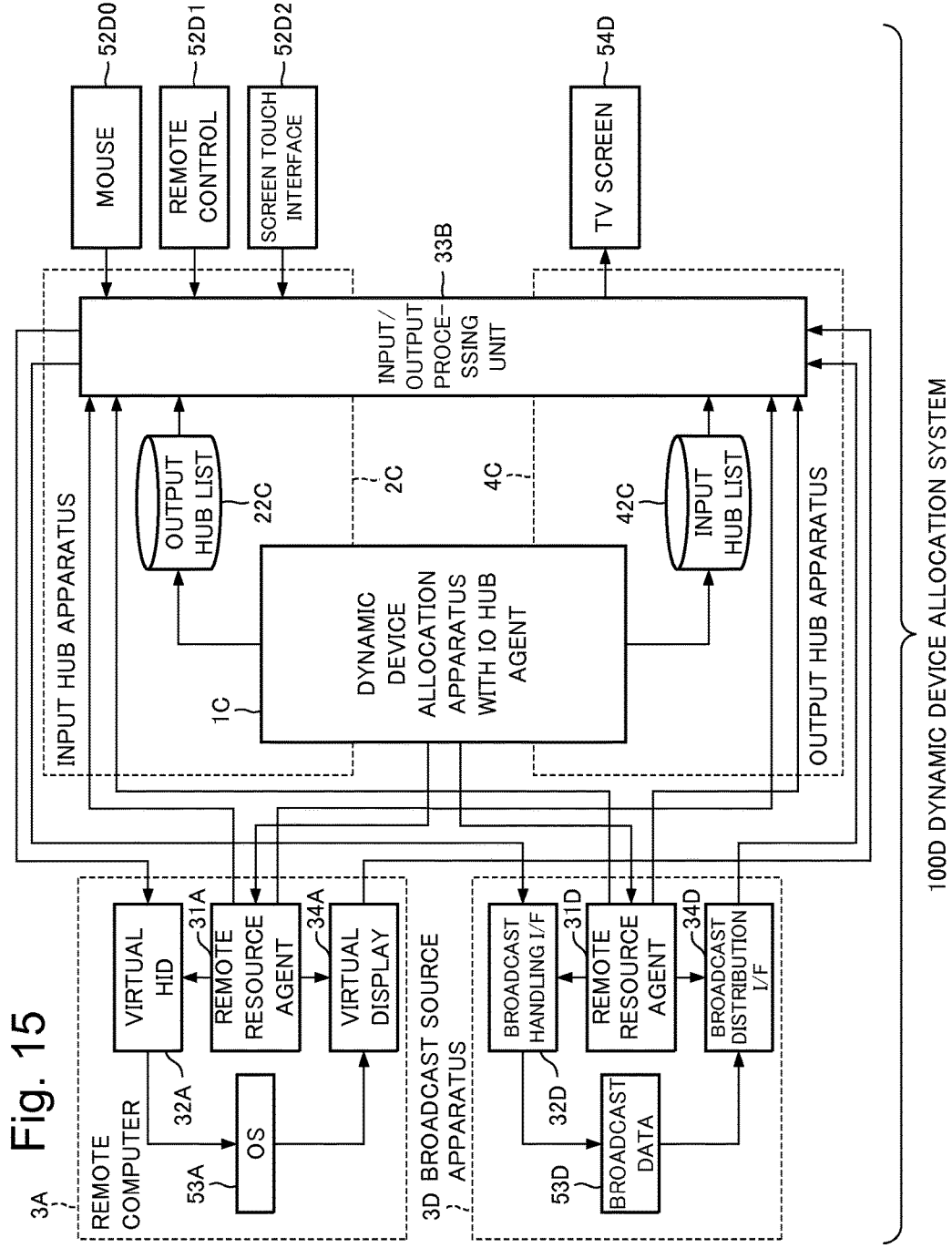
FIG. 15 is a block diagram showing an outline of a logical configuration of the fourth modification of the dynamic device allocation system according to the first exemplary embodiment of the invention of the present application.

FIG. 14 is a conceptual block diagram showing a physical configuration of a dynamic device allocation system 100D according to the modification. FIG. 15 is a conceptual block diagram showing an outline of a logical configuration of the dynamic device allocation system 100D according to the modification.

The dynamic device allocation system 100D includes the remote computer 3A which is connected with the remote NW 60A1, a broadcast source apparatus 3D which is connected with a remote NW 60D1, and a touch operation TV 63D which is connected with a local NW 60D0. The touch operation TV 63D is operable by a touch operation of a user.

The touch operation TV 63D includes the dynamic device distribution apparatus with IO hub agent 1C, the input hub apparatus 2C, the output hub apparatus 4C, a touch-screen-type-interface 52D2 and a TV screen 54D. The touch operation TV 63D is connected with a mouse 52D0 and a remote control 52D1 which are input devices. Here, the touch-screen-type-interface 52D2 and the TV screen 54D are an input device and an output device respectively which are arranged inside the touch operation TV 63D.

The touch operation TV 63D displays both of broadcast data 53D which is distributed by the broadcast source apparatus 3D, and PC screen data, which is received from the remote computer 3A, on the TV screen 54D. In the case that information is inputted from the mouse 52D0, the dynamic device allocation system 100D carries out an information processing which is related to any one of operating the remote computer 3A, changing a TV channel, and changing a display position on the TV screen. In the case that information is inputted from the remote control 52D1, the dynamic device allocation system 100D carries out the information processing which is related to changing the TV channel. In the case that information is inputted from the touch-screen-type-interface 52D2, the dynamic device distribution system 100D carries out the information processing which is related to changing the display position on the TV screen.

A process which the dynamic device allocation distribution apparatus with IO hub agent 1C carries out is similar to the process which is described in the third modification. A broadcast operation I/F (interface) 32D and a broadcast distribution I/F 34D of the broadcast source apparatus 3D uses the existing I/Fs which can process the broadcast data.

The dynamic device allocation system 100D according to the modification can allocate the I/O device, which inputs and outputs information related to information processing carried out in the system, dynamically and flexibly to the information processing. The reason is that the dynamic device allocation apparatus with IO hub agent 1C, the execution subject, the input device and the output device operate as follows. That is, on the basis of the device allocation information which associates the identifier of the execution subject carrying out the information process, the identifier of the input device, and the identifier of the output device, the dynamic device allocation apparatus with IO hub agent 1C instructs the execution subject, the input device and the output device to carry out the information processing. Then, the execution subject, the input device and the output device carry out the information processing according to contents of the instruction which is issued by the dynamic device allocation apparatus with IO hub agent 1C.

According to the dynamic device allocation system 100D of the modification, a user can continue a familiar operating since the device is mapped for each displayed content when processing a plurality of contents, each of which is displayed on the screen, at the same time. Moreover, according to the modification, the displayed content and the input device are associated, and coupling between the displayed content and the output device is loose.

Accordingly, even if the remote computer 3A and the broadcast source apparatus 3D, which output information related to the displayed content, use existing technology with respect to input/output of information, the touch operation TV 63D can adopt technology which is not dependent on the existing technology. Moreover, even in the case that the remote computer 3A and the broadcast source apparatus 3D apply the screen output method developed by the new IT technology, the touch operation TV 63D can carry out display on a local output device.

Since the dynamic device allocation system 100D displays in harmony with the output device, when a part of screen elements of the display screen is damaged, the dynamic device allocation system 100D can take out a measure to detect the damage and to change the display area. Moreover, according to the dynamic device allocation system 100D, since it is possible to change the screen output of the touch operation TV 63D without the remote computer 3A's carrying out the information processing, for example, it is possible to carry out switching between displaying 3D data or 2D data on the screen, and recording images with respect to a specific broadcast.

Fifth Modification of the First Exemplary Embodiment

There is a case that the dynamic device allocation system according to the exemplary embodiment mentioned above is a system which uses a head mount display in the thin client environment as a fifth modification described in the following.

Figure 16:
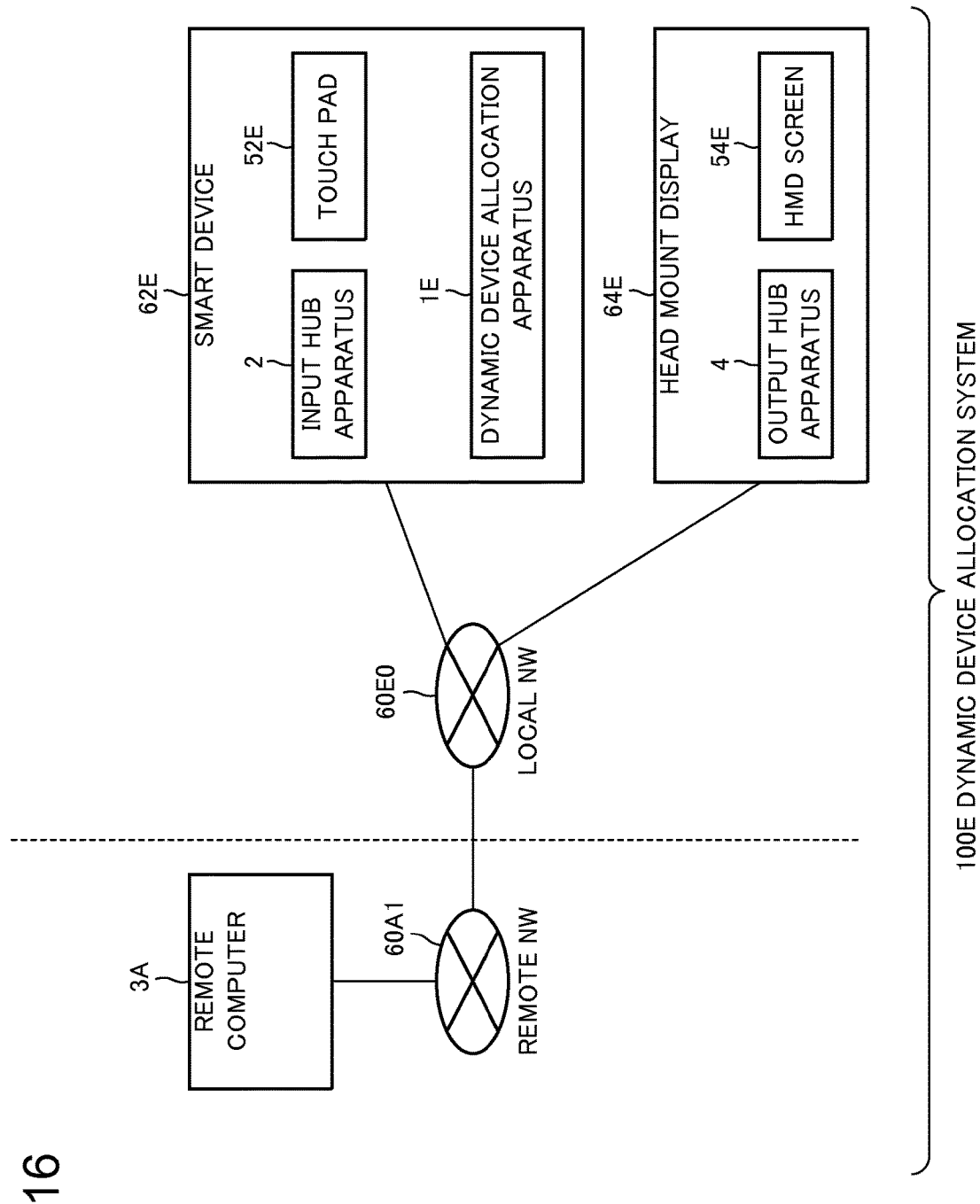
FIG. 16 is a block diagram showing a physical configuration of a fifth modification of the dynamic device allocation system according to the first exemplary embodiment of the invention of the present application.
Figure 17:
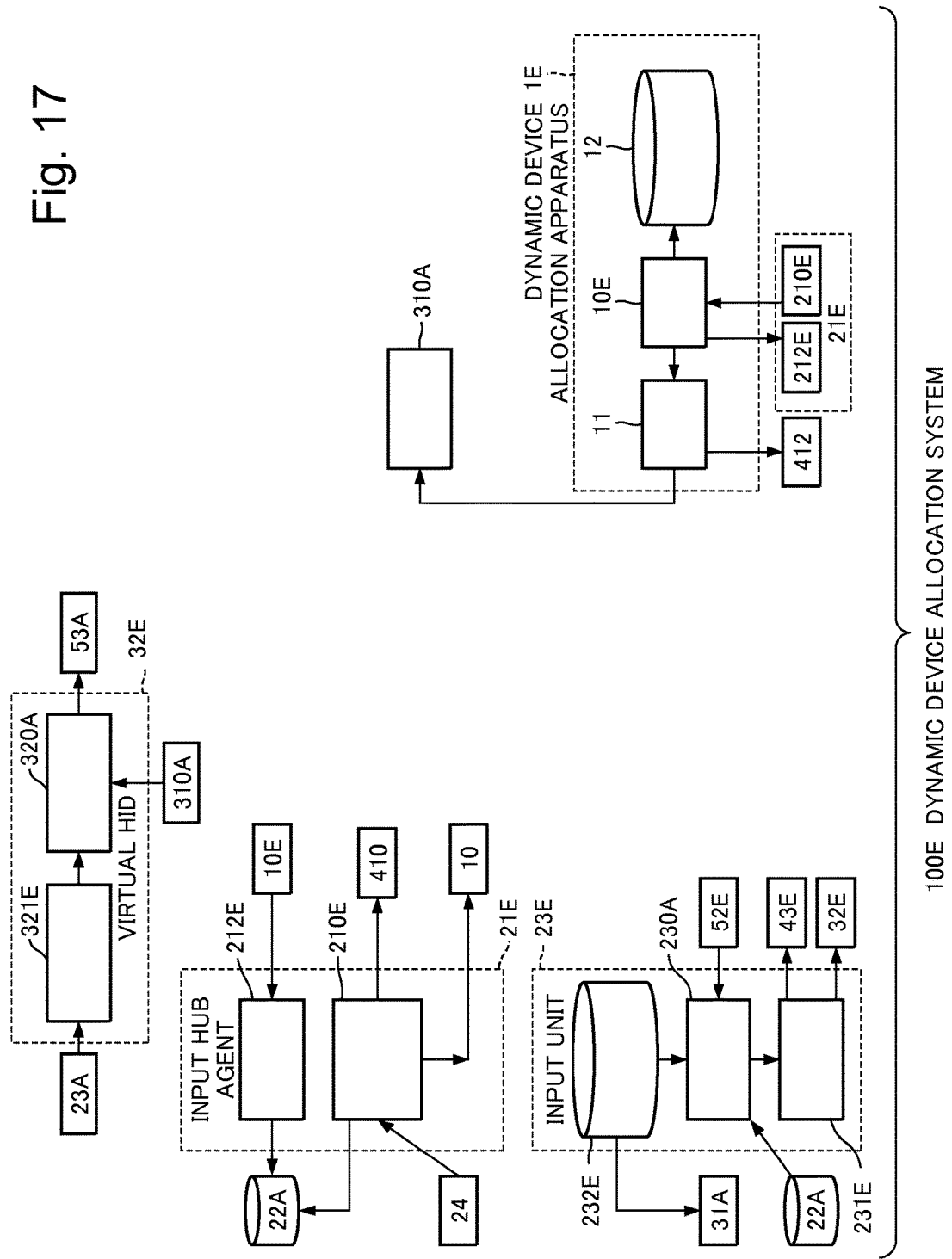
FIG. 17 is a block diagram showing details of a logical configuration of the fifth modification of the dynamic device allocation system according to the first exemplary embodiment of the invention of the present application.

FIG. 16 is a conceptual block diagram showing a physical configuration of a dynamic device allocation system 100E according to the modification. FIG. 17 is a conceptual block diagram showing details of a logical configuration of the dynamic device allocation system 100E according to the modification.

The dynamic device allocation system 100E includes the remote computer 3A which is connected with the remote NW 60A1, a smart device 62E which is connected with a short distance NW 60E0 and a head mount display 64E. The head mount display 64E includes the output hub apparatus 4 and an HMD screen 54E.

The smart device 62E is a device such as a smart phone, a tablet terminal or a wristwatch type terminal. Functions, which the smart device 62E has and which are related to the input hub apparatus 2 and the dynamic device allocation apparatus 1E, are realized as individual processes carried out by CPU which makes the smart device 62E operate, and inter-process communication is carried out in each process. Here, a process which the dynamic device allocation apparatus 1E carries out is similar to the process which the dynamic device allocation apparatus 1 in the first exemplary embodiment carries out.

An input encrypting part 231E and an input decoding part 321E carries out the encryption processing by use of not the common key but the public key. Here, it is assumed that the public key can be used in each node. In general, performance of the encryption processing by use of the public key is inferior in comparison with the encryption processing by use of the common key. But, according to the modification, since input information to be processed is inputted from a touch pad 52E, and an amount of communication data is small relatively, no particular problem is caused. Moreover, a usage deciding part 212E carries out a process after completion of a process carried out by a mapping receiving unit 10E without waiting for the process carried out by the registration receiving part 310A.

The dynamic device allocation system 100E according to the modification can allocate the I/O device, which inputs and outputs information related to information processing carried out in the system, dynamically and flexibly to the information processing. The reason is that the dynamic device allocation apparatus 1E, the execution subject, the input device and the output device operate as follows. That is, on the basis of the device allocation information which associates the identifier of the execution subject carrying out the information process, the identifier of the input device, and the identifier of the output device, the dynamic device allocation apparatus 1E instructs the execution subject, the input device and the output device to carry out the information processing. Then, the execution subject, the input device and the output device carry out the information processing according to contents of the instruction which is issued by the dynamic device allocation apparatus 1E.

The dynamic device allocation system 100E according to the modification realizes a thin client environment which uses the smart device 62E and the head mount display 64E. As a result, the dynamic device allocation system 100E can prevent the peek, which brings about the security vulnerability, in the system using the mobile terminal. Here, when a user puts off the head mount display 64E, the output hub apparatus 4 may carry out disconnection related to the head mount display 64E once. In this case, when the user puts on the head mount display 64E again, the output hub apparatus 4 may connect the head mount display 64E again by use of the iris authentication or the like. At this point of time, the smart device 62E carries out selection related to the remote computer 3A, and the head mount display 64E carries out the user authentication. Accordingly, in this case, the dynamic device distribution system 100E needs to incorporate the user authentication processing, which is carried out between the input hub apparatus 2 and the output hub apparatus 4, in addition to including the beacon sending part 44 and the beacon receiving part 24.

Since the smart device 62E carries out functions, which are related to the input hub apparatus 2 and the dynamic device allocation apparatus 1E, as a process realized by software, the dynamic device allocation system 100E copes with updating a function, which is carried out frequently, with ease. After returning control promptly from the registration unit 10E to the usage deciding part 212E, the dynamic device distribution system 100E reports completion of processes related to the registration receiving part 310A to the output hub apparatus 4 after event detection of the completion without the effect that it takes a long time to exchange information between the output hub device 4 and the remote computer 3A due to a narrow bandwidth. Accordingly, the dynamic device allocation system 100E can reduce an amount of CPU resources which the dynamic device allocation apparatus 1E uses on the smart device 62E, and consequently, can reduce power consumption of the smart device 62E.

Sixth Modification of the First Exemplary Embodiment

There is a case that the dynamic device allocation system according to the exemplary embodiment mentioned above is a distribution system, which distributes information from a server to a large screen, as a sixth modification described in the following.

Figure 18:
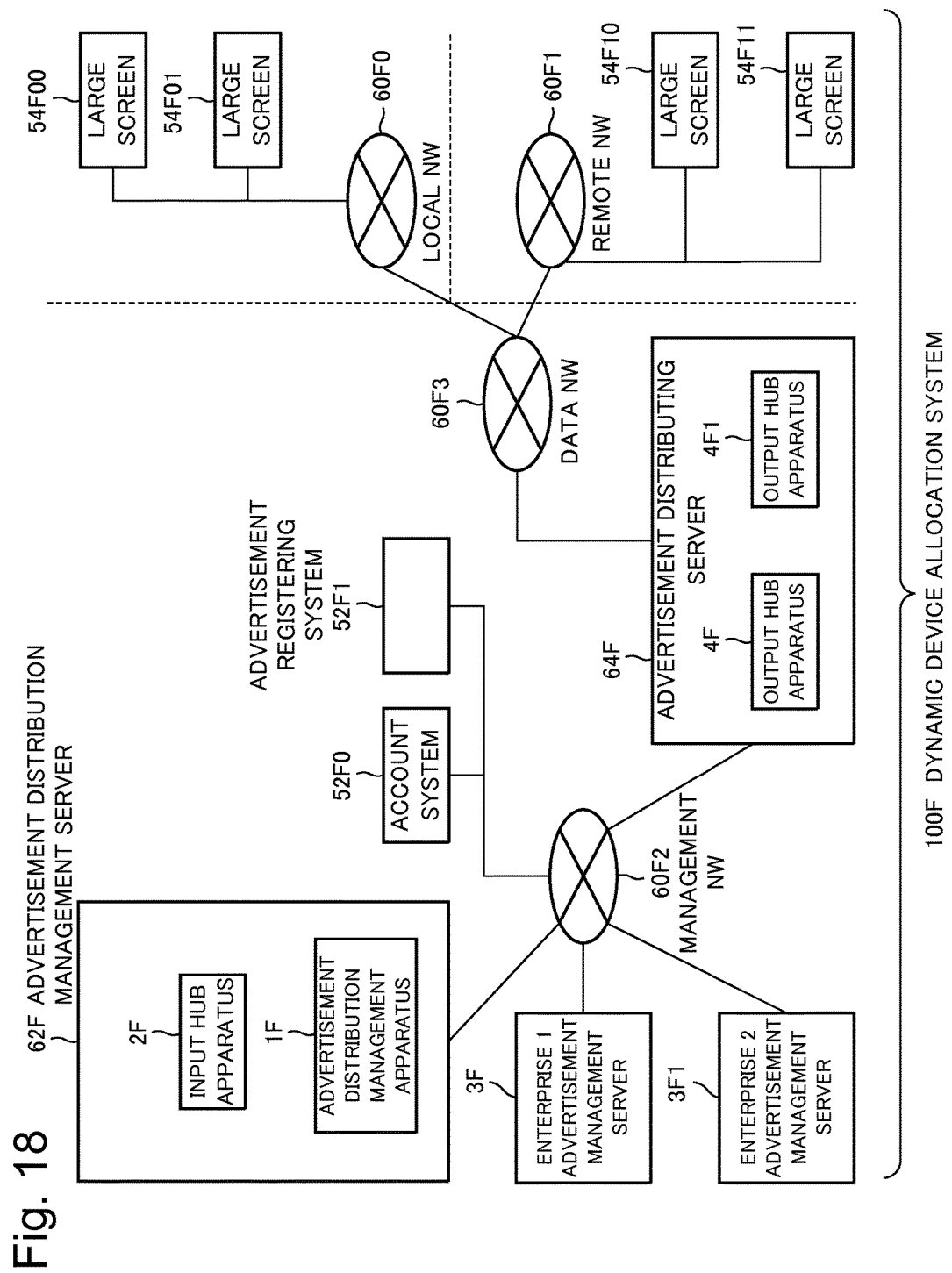
FIG. 18 is a block diagram showing a physical configuration of a sixth modification of the dynamic device allocation system according to the first exemplary embodiment of the invention of the present application.
Figure 19:
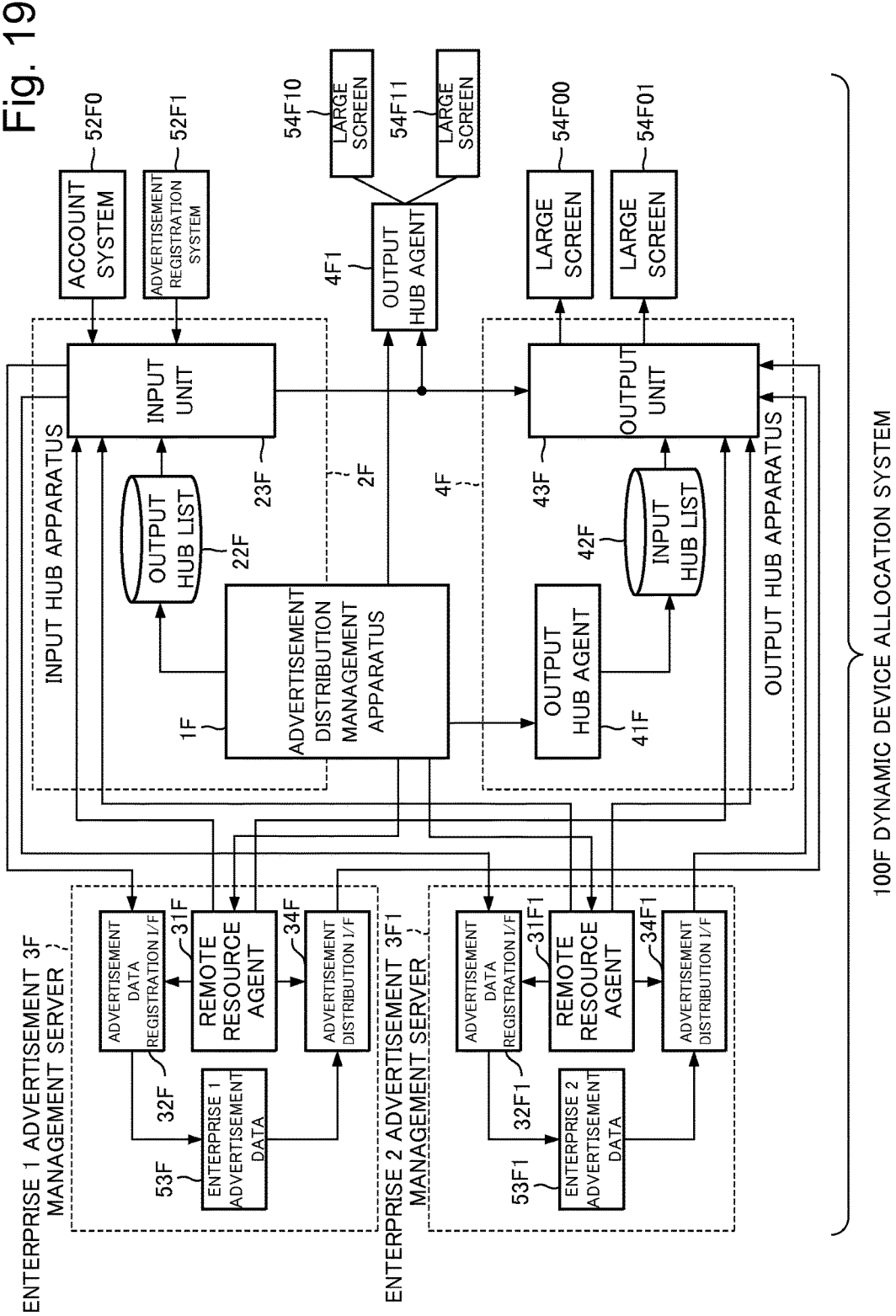
FIG. 19 is a block diagram showing an outline of a logical configuration of the sixth modification of the dynamic device allocation system according to the first exemplary embodiment of the invention of the present application.
Figure 20:
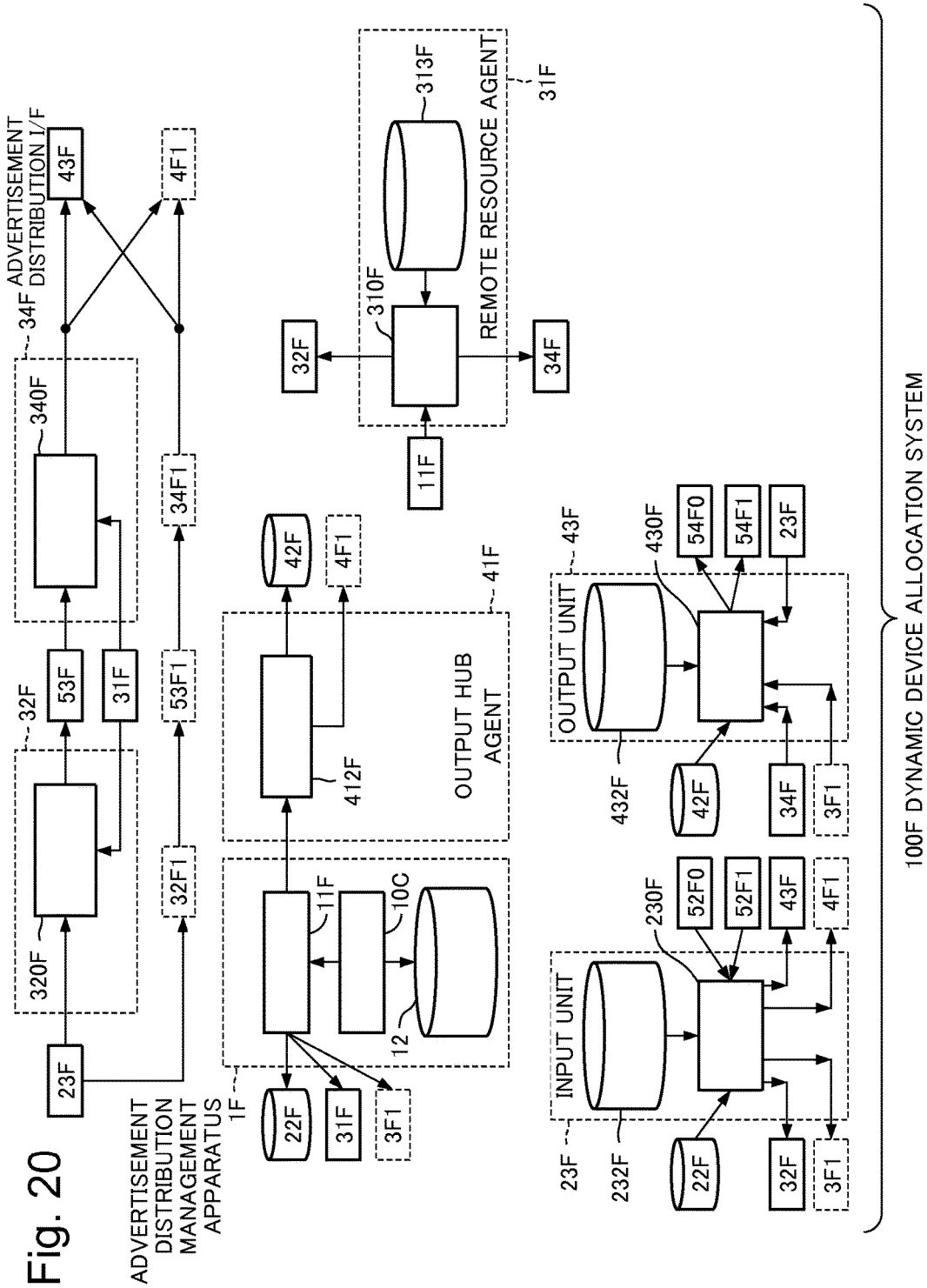
FIG. 20 is a block diagram showing details of the logical configuration of the sixth modification of the dynamic device allocation system according to the first exemplary embodiment of the invention of the present application.

FIG. 18 is a conceptual block diagram showing a physical configuration of a dynamic device allocation system 100F according to the modification. FIG. 19 is a conceptual block diagram showing an outline of a logical configuration of the dynamic device allocation system 100F according to the modification. FIG. 20 is a conceptual block diagram showing details of the logical configuration of the dynamic device allocation system 100F according to the modification.

The dynamic device allocation system 100F includes large screens 54F00 and 54F01 which are connected with a short distance NW 60F0, large screens 54F10 and 54F11 which are connected with a remote NW 60F1, and an advertisement distributing server 64F which is connected with a management NW 60F2 and a data NW 60F3. Furthermore, the dynamic device allocation system 100F includes an advertisement distribution management server 62F, an enterprise 1 advertisement management server 3F, an enterprise 2 advertisement management server 3F1, an account system 52F0 and an advertisement registering system 52F1 which are connected with a management NW 62F2.

The advertisement distribution management server 62F includes an advertisement distribution management apparatus 1F and an input hub apparatus 2F. The advertisement distribution management apparatus 1F has functions which the dynamic device allocation apparatus 1 and the input hub agent 21 in the first exemplary embodiment have. The advertisement distributing server 64F includes an output hub apparatus 4F and an output hub apparatus 4F1.

Here, according to the modification, since the system processing has no necessity of carrying out the encryption communication, the dynamic device allocation system 100F does not include a block which is related to the encryption processing.

The output hub apparatus 4F outputs information to the large screen 54F00 and the large screen 54 F01, whose types are the same, for display on the screen. In order to generate a device signal for outputting enterprise 1 advertisement data 53F or enterprise 2 advertisement data 53F1, the output hub apparatus 4F uses the same driver. Moreover, the dynamic device allocation system 100F uses two of the output hub apparatus 4F and the output hub apparatus 4F1 by use of the input hub apparatus 2F through the advertisement distribution management apparatus 1F.

The dynamic device allocation system 100F according to the modification can allocate the I/O device, which inputs and outputs information related to information processing carried out in the system, dynamically and flexibly to the information processing. The reason is that the advertisement distribution management apparatus 1F, the execution subject, the input device and the output device operate as follows. That is, on the basis of the device allocation information which associates the identifier of the execution subject carrying out the information process, the identifier of the input device, and the identifier of the output device, the advertisement distribution management apparatus 1F instructs the execution subject, the input device and the output device to carry out the information processing. Then, the execution subject, the input device and the output device carry out the information processing according to contents of the instruction which is issued by the advertisement distribution management apparatus 1F.

According to the dynamic device allocation system 100F of the modification, even if equipment which distributes the advertisement is arranged at a far location from the large screen, it is possible to distribute the advertisement. Moreover, differently from a general broadcast, the dynamic device allocation system 100F can distribute the advertisement only to limited output devices. Here, while the encryption processing is not carried out between an output unit 43F and each large screen according to the dynamic device allocation system 100F, the encryption processing may be carried out by preparing a common key, which is related to a whole of the system, in advance According to the dynamic device allocation system 100F, since the advertisement is not displayed at an unnecessary location, it is possible to reduce resources which a service provider prepares. According to the dynamic device allocation system 100F, by a service receiving user's managing a location where the advertisement is displayed, it is possible to collect basic data for analyzing customer tendency.

According to the dynamic device allocation system 100F, by connecting with the output hub device whose output device includes a dedicated driver, it is possible to carry out efficient data conversion. Moreover, according to the dynamic device allocation system 100F, even in the case that a large number of the large screens, whose types are the same, are procured, it is possible to expand the system by procuring one output hub device which includes the dedicated driver corresponding to the type.

Seventh Modification of the First Exemplary Embodiment

There is a case that the dynamic device allocation system according to the exemplary embodiment mentioned above is a system to share a large screen including a plurality of screen areas each of which is a segment of the large screen.

Figure 21:
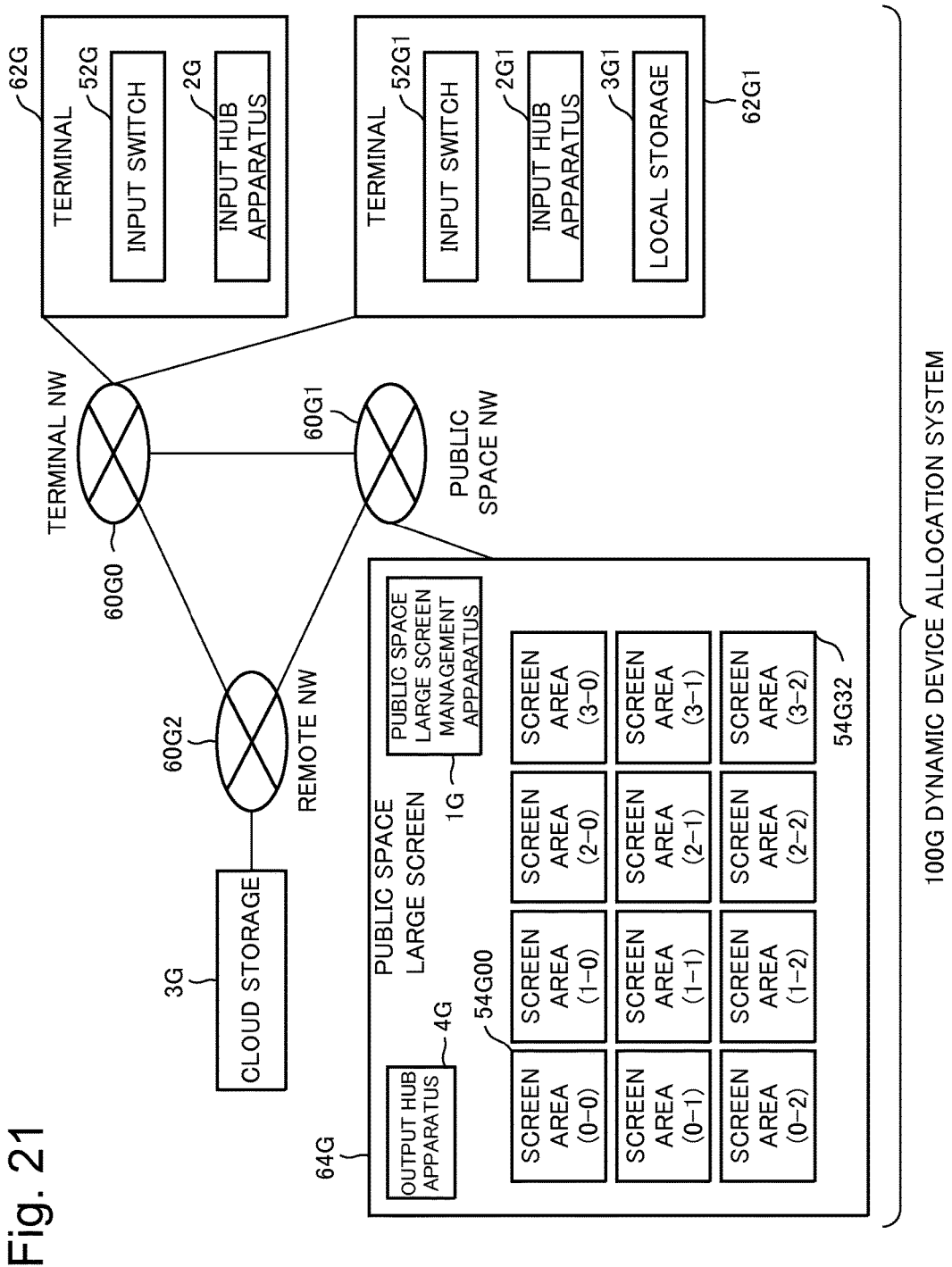
FIG. 21 is a block diagram showing a physical configuration of a seventh modification of the dynamic device allocation system according to the first exemplary embodiment of the invention of the present application.
Figure 22:
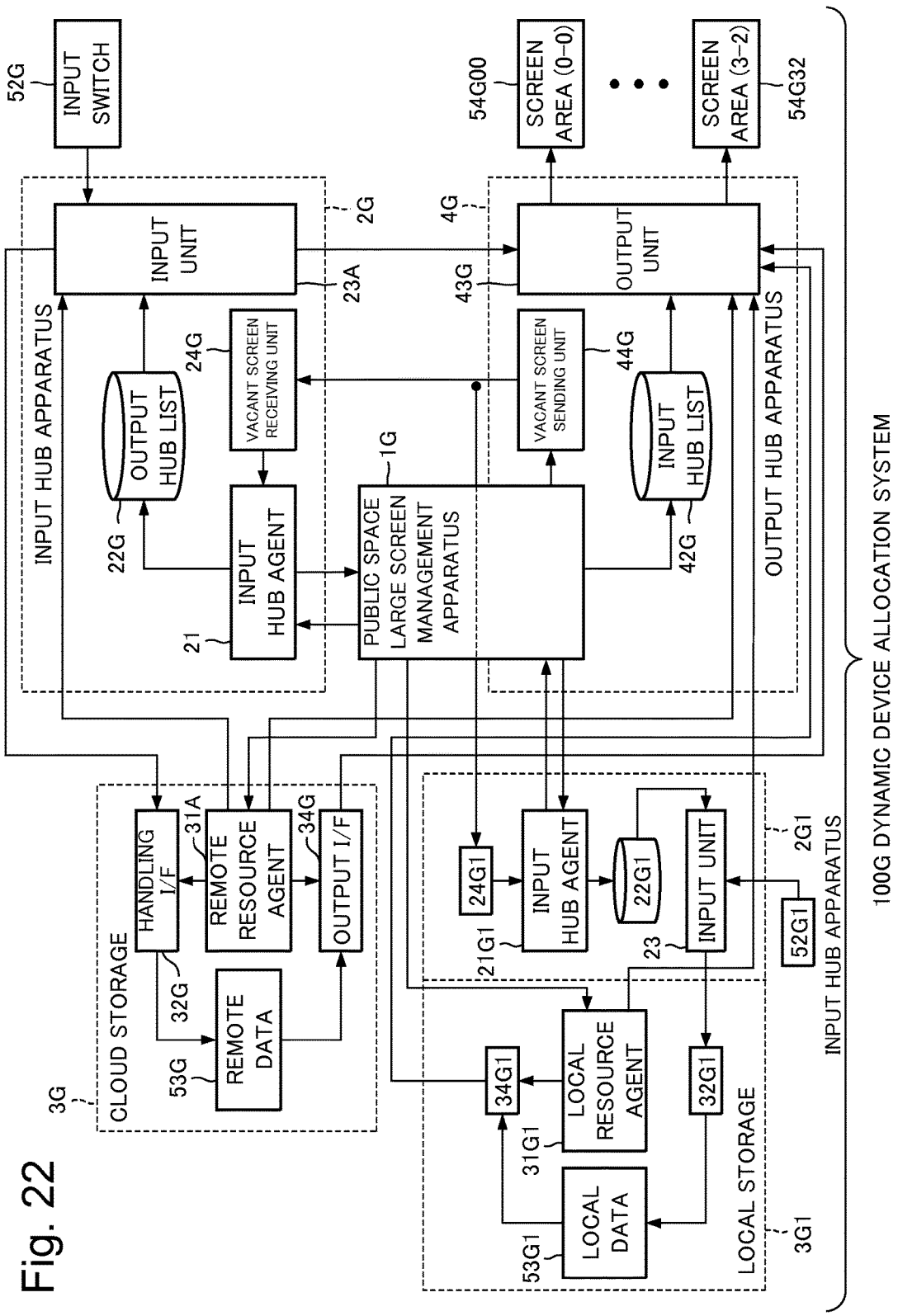
FIG. 22 is a block diagram showing an outline of a logical configuration of the seventh modification of the dynamic device allocation system according to the first exemplary embodiment of the invention of the present application.
Figure 23:
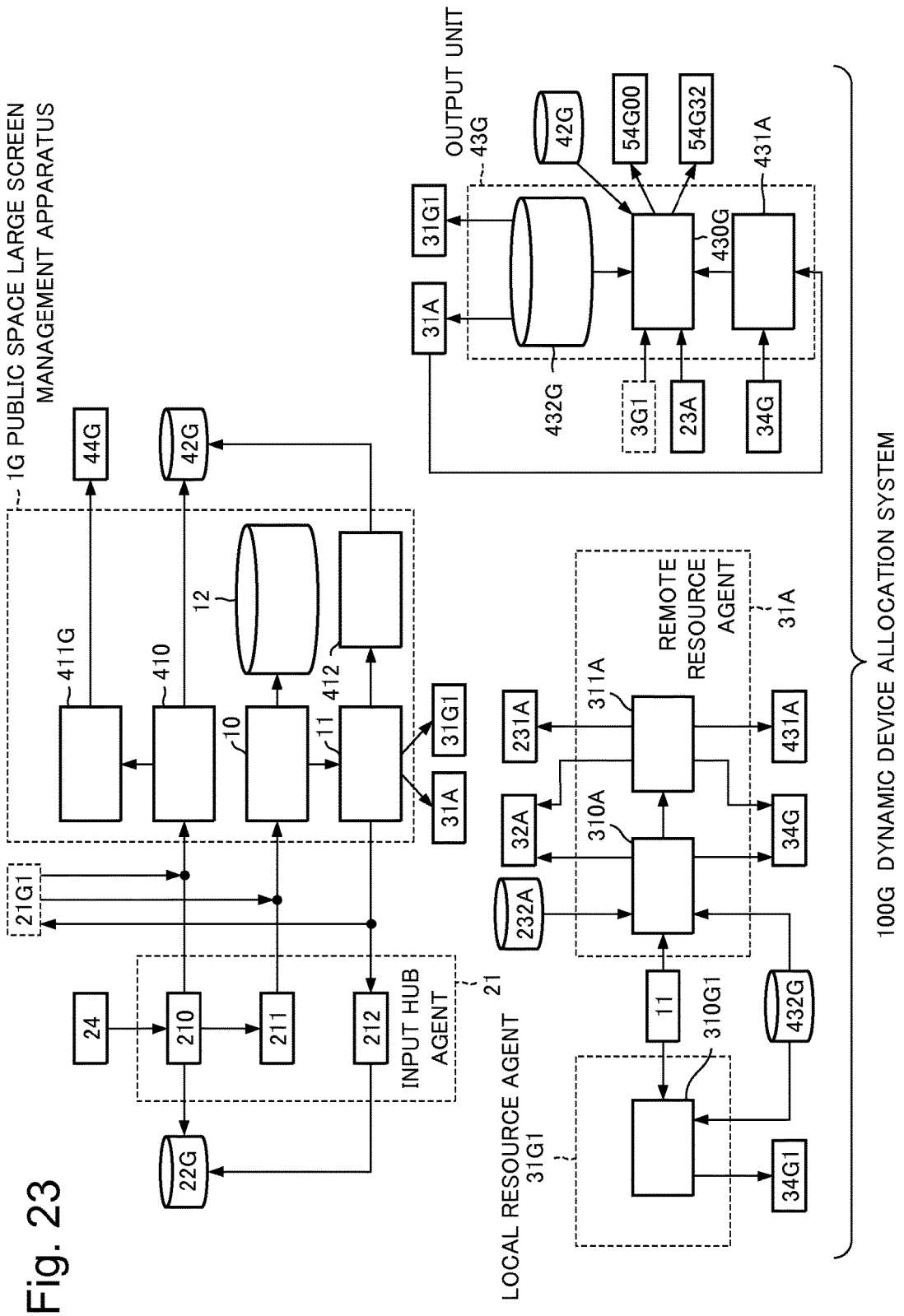
FIG. 23 is a block diagram showing details of the logical configuration of the seventh modification of the dynamic device allocation system according to the first exemplary embodiment of the invention of the present application.

FIG. 21 is a conceptual block diagram showing a physical configuration of a dynamic device allocation system 100G according to the modification. FIG. 22 is a conceptual block diagram showing an outline of a logical configuration of the dynamic device allocation system 100G according to the modification. FIG. 23 is a conceptual block diagram showing details of the logical configuration of the dynamic device allocation system 100G according to the modification.

The dynamic device allocation system 100G includes terminals 62G and 62G1 which are connected with a terminal NW 60G0, a public space large screen 64G which is connected with a public space NW 60G1 and a cloud storage 3G which is connected with a remote NW 60G2. The terminal 62G includes an input switch 52G and an input hub apparatus 2G. The terminal 62G1 includes an input switch 52G1, an input hub apparatus 2G1 and a local storage 3G1.

The public space large screen 64G includes a public space large screen management apparatus 1G, screen areas 54G00 to 54G32 and an output hub apparatus 4G. The public space large screen management apparatus 1G has functions which the dynamic device allocation apparatus 1 and the output hub agent 41 in the first exemplary embodiment have.

By use of a vacant space screen sending unit 44G and a vacant screen receiving unit 24G, the dynamic device allocation system 100G detects an available screen area and uses the detected screen area. The dynamic device allocation system 100G use the output hub apparatus 4G by use of two of the input hub apparatus 2G and the input hub apparatus 2G1 through the public space large screen management apparatus 1G. The terminal 62G1 includes the local storage 3G1. The remote resource agent 31A carries out the encryption processing to remote data 53G. On the other hand, a local resource agent 31G1 does not carry out the encryption processing to local data 53G1, and does not require input device information.

The dynamic device allocation system 100G according to the modification can allocate the I/O device, which inputs and outputs information related to information processing carried out in the system, dynamically and flexibly to the information processing. The reason is that the public space large screen management apparatus 1G, the execution subject, the input device and the output device operate as follows. That is, on the basis of the device allocation information which associates the identifier of the execution subject carrying out the information process, the identifier of the input device, and the identifier of the output device, the public space large screen management apparatus 1G instructs the execution subject, the input device and the output device to carry out the information processing. Then, the execution subject, the input device and the output device carry out the information processing according to contents of the instruction which is issued by the public space large screen management apparatus 1G.

According to the dynamic device allocation system 100G of the modification, it is possible that both of a local environment side using the local storage 3G1 and a remote environment side using the cloud storage 3G share the public space large screen 64G including a plurality of screen areas. Moreover, according to the dynamic device allocation system 100G, it is possible to simplify a calculation processing related to the terminal 62G1, since it is possible to process signals, which are provided by the input unit and the local storage 3G1, by use of common communication without carrying out the encryption processing when processing the local data 53G1.

Second Exemplary Embodiment

Figure 24:
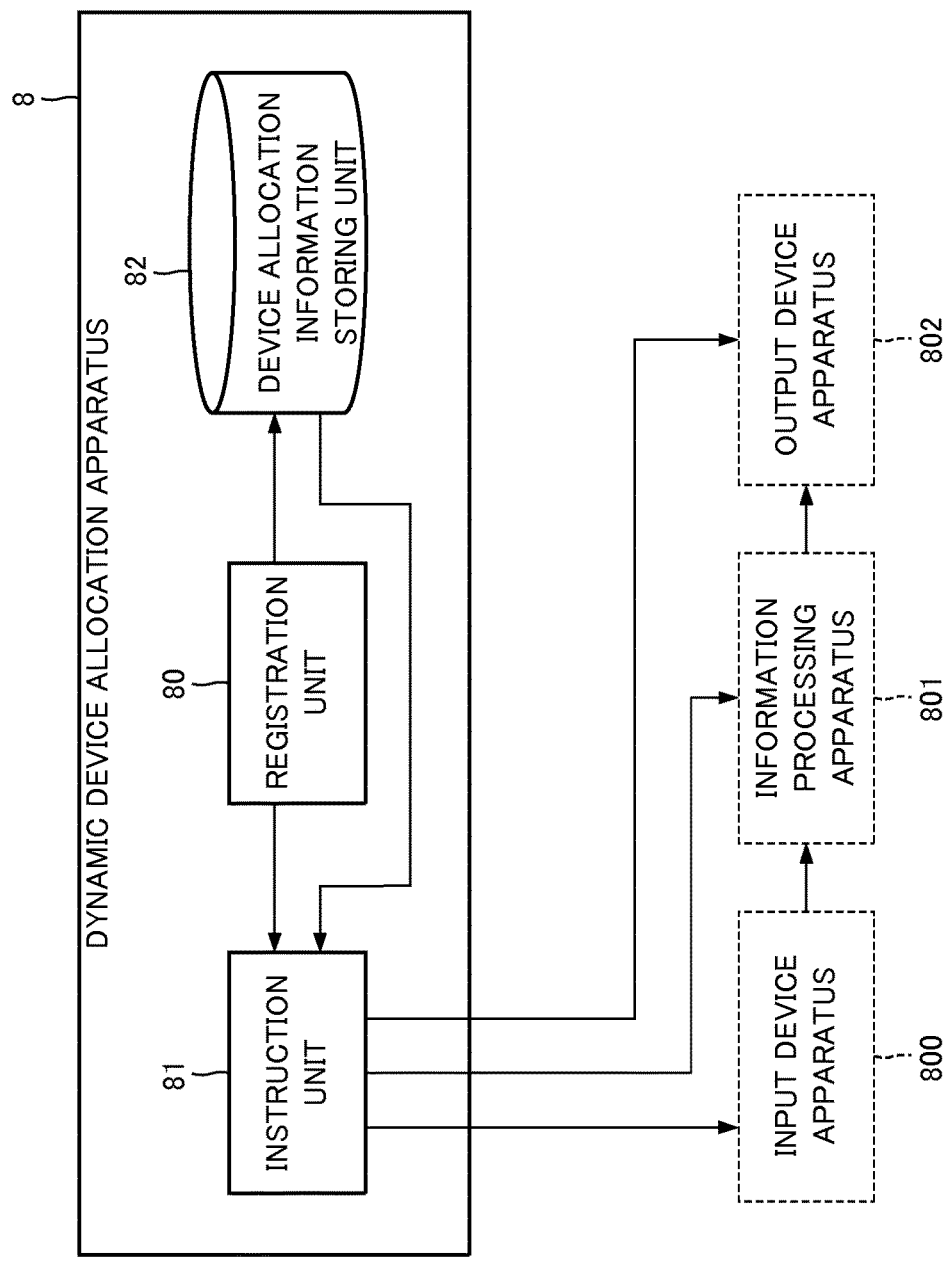
FIG. 24 is a block diagram showing a configuration of a dynamic device allocation apparatus according to a second exemplary embodiment of the invention of the present application.

FIG. 24 is a conceptual block diagram showing a configuration of a dynamic device allocation apparatus 8 of a second exemplary embodiment.

The dynamic device allocation apparatus 8 of the exemplary embodiment includes a registration unit 80, an instruction unit 81 and a device allocation information storing unit 82.

The device allocation information storing unit 82 stores device allocation information which associates an input device identifier, an output device identifier and an information processing apparatus identifier.

The input device identifier is an identifier which can identify an input device apparatus 800 which inputs information into a designated information processing apparatus 801. The output device identifier is an identifier which can identify an output device apparatus 802 which inputs information outputted from the designated information processing apparatus 801. The information processing apparatus identifier is an identifier which can identify an information processing apparatus 801 inputting a result of carrying out an information processing to information, which is inputted from the designated input device apparatus 800, into the designated output device apparatus 802.

When the information processing apparatus 801 carries out the information processing, the registration unit 80 generates the device allocation information which specifies contents of the information processing, and registers the generated device allocation information with the device allocation information storing unit 82.

The instruction unit 81 generates information processing instruction information which instructs the input device apparatus 800, the output device apparatus 802 and the information processing apparatus 801 to carry out the information processing according to the device allocation information which the device allocation information storing unit 82 stores.

The dynamic device allocation apparatus 8 according to the modification can allocate the I/O device, which inputs and outputs information related to information processing carried out in a system, dynamically and flexibly to the information processing. The reason is that the dynamic device allocation apparatus 8, the information processing apparatus 801, the input device apparatus 800 and the output device apparatus 802 operate as follows. That is, on the basis of the device allocation information which associates the identifier of the information processing apparatus 801 carrying out the information process, the identifier of the input device apparatus 800, and the identifier of the output device apparatus 802, the dynamic device allocation apparatus 8 instructs the information processing apparatus 801, the input device apparatus 800 and the output device apparatus 802 to carry out the information processing. Then, the information processing apparatus 801, the input device apparatus 800 and the output device apparatus 802 carry out the information processing according to contents of the instruction which is issued by the dynamic device allocation apparatus 8.

Example of Hardware Configuration

In the exemplary embodiments described above, each unit or part illustrated in FIGS. 1, 2, and 5-24 can be regarded as a functional (processing) unit (software module) of a software program. Here, segmentation of the units or parts in those drawings is made to illustrate a configuration for convenience of description, and various configurations can be assumed when implementing them. An example of hardware environment in this case will be described with reference to FIG. 25.

Figure 25:
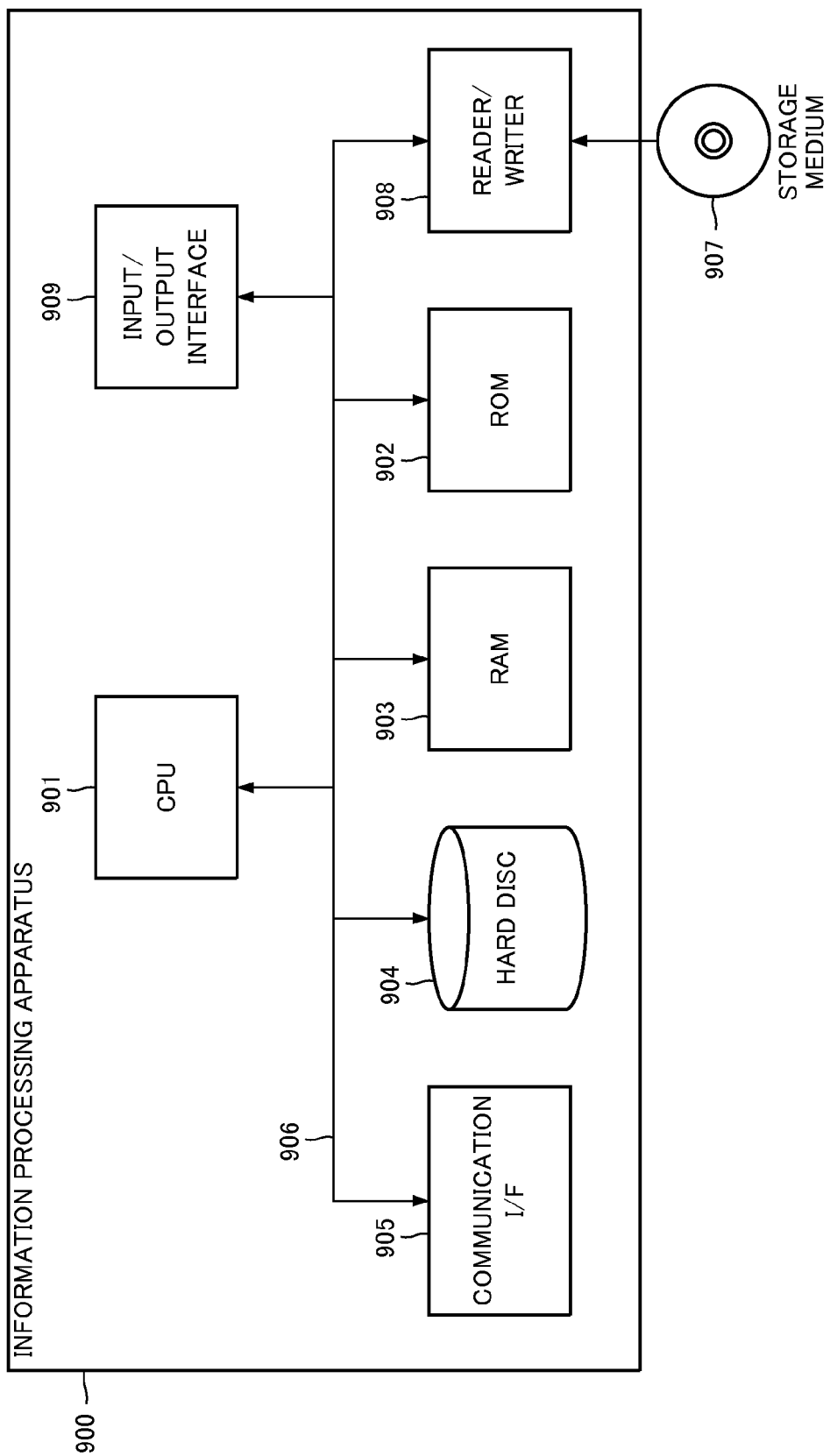
FIG. 25 is a block diagram showing a configuration of an information processing apparatus which can carry out the dynamic device allocation apparatus according to each the exemplary embodiment and the modification of each the exemplary embodiment of the invention of the present application.
Figure 26:
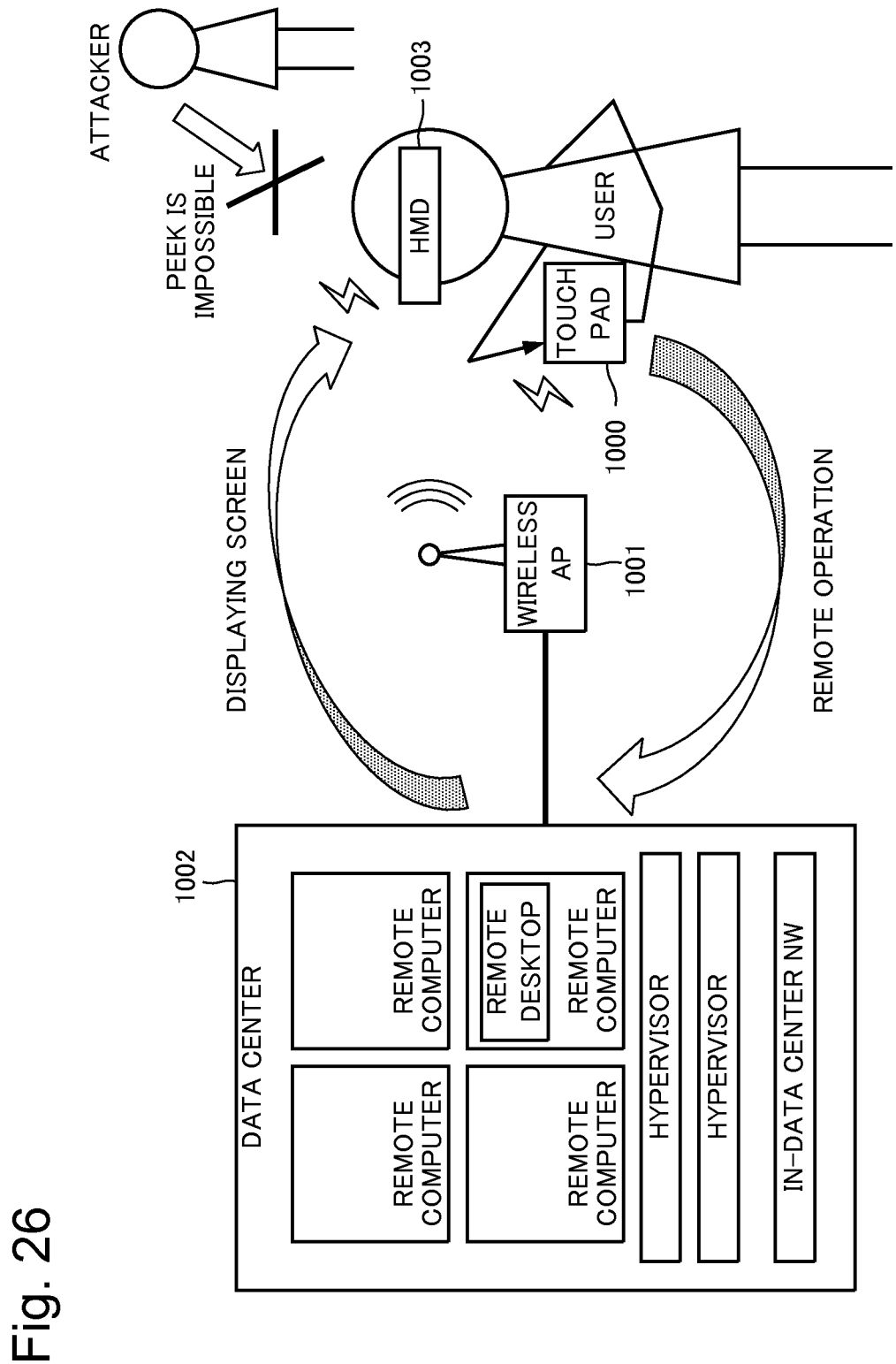
FIG. 26 is a diagram exemplifying an usage form combining HMD with the thin client environment which is a background of the invention of the present application.

FIG. 25 is a diagram illustrating a configuration of an information processing apparatus 900 (computer), as an example, which can perform as the dynamic device allocation apparatus according to each of the exemplary embodiments of the present invention. That is, FIG. 25 shows a configuration of a computer (information processing apparatus) such as a server which can realize the dynamic device allocation apparatuses shown in FIGS. 1, 2, and 5-24 and represents hardware environment which can realize the functions in the exemplary embodiments described above.

The information processing apparatus 900 shown in FIG. 25 is a general computer comprising a CPU (Central Processing Unit) 901, a ROM (Read Only Memory) 902, a RAM (Random Access Memory) 903, a hard disk (storage device) 904, a communication interface 905 connected with external devices, a reader/writer 908 capable of reading and writing data stored in a recording medium 907 such as a CD-ROM (Compact Disc Read Only Memory) and an input/output interface 909, wherein these components are connected with each other via a bus (communication wire) 906.

Then, the present invention described above taking the exemplary embodiments as examples is achieved by providing the information processing apparatus 900 shown in FIG. 25 with a computer program capable of realizing the functions of the block configuration diagrams (FIGS. 1, 2, and 5-24) or the flow charts (FIGS. 3A and 3B and 4), which were referred to in the descriptions of the exemplary embodiments, and by then reading out the computer program into the CPU 901 of the hardware and interpreting and executing the computer program there. The computer program provided to the apparatus may be stored in a readable/writable volatile storage memory (RAM 903) or a non-volatile storage device such as the hard disk 904.

In the above-described case, it is possible to adopt a currently general procedure, as a method of providing a computer program into the hardware, such as a method of installing a program into the apparatus through various types of recording medium 907 and a method of downloading a program via a communication line such as the internet. In such cases, the present invention can be regarded as being constituted by the code constituting the computer program or by the non-transitory computer readable recording medium 907 storing the code.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A dynamic device allocation system, comprising:
one or more dynamic device allocation apparatuses, one or more information processing apparatuses, one or more input device control apparatus, and one or more output device control apparatus, wherein
each dynamic device allocation apparatus comprises:
at least one processor; and
a memory storing instructions to be executed by the processor by causing the processor to implement:
a device allocation information storing unit to store device allocation information associating identifiers of three different apparatuses which are connected to be able to communicate, which include an input device identifier which can identify an input device apparatus inputting information into a designated information processing apparatus, an output device identifier which can identify an output device apparatus inputting information which is outputted from the designated information processing apparatus, and an information processing apparatus which inputs a result of information processing carried out to information, which is inputted from the input device apparatus which is designated, into the output device apparatus which is designated;
a registration unit to generate the device allocation information, which specifies contents of the information processing, when the designated information processing apparatus, the input device apparatus and the output device apparatus carry out the information processing, and to register the generated device allocation information with the device allocation information storing unit; and
an instruction unit to generate information processing instruction information which instructs the input device apparatus, the output device apparatus and the information processing apparatus to carry out the information processing according to the device allocation information which the device allocation information storing unit stores;
the information processing apparatuses each of which carries out the information processing on the basis of the information processing instruction information;
the input device control apparatuses which connect the one or more input device apparatuses and the one or more information processing apparatuses, and each of which inputs information, which is outputted by any one of the input device apparatuses, into any one of the information processing apparatuses as information processing input information on the basis of the information processing instruction information; and
the output device control apparatuses which connect the one or more output device apparatuses and the one or more information processing apparatuses, and each of which inputs information processing output information, which is information outputted by any one of the information processing apparatuses, into at least any one of the output device apparatuses on the basis of the information processing instruction information.

2. The dynamic device allocation system according to claim 1, wherein
the output device control apparatus inputs list information, which includes output device identifiers capable of identifying the output device apparatuses which are in an unused state, into the input device control apparatus, wherein
when the information processing apparatus carries out the information processing, the input device control apparatus selects any one of the output device apparatuses, which are in the unused state, on the basis of the list information, and inputs an output device identifier, which identifies the selected output device apparatus, into the registration unit, and wherein
the registration unit generates the device allocation information on the basis of the output device identifier which is inputted.

3. The dynamic device allocation system according to claim 1, wherein the input device control apparatus stores input device specification information, which indicates specification on the input device apparatuses, in association with the input device identifiers, wherein the output device control apparatus stores output device specification information, which indicates specification on the output device apparatuses, in association with the output device identifiers, and wherein the information processing apparatus acquires the input device specification information on the input device apparatus and the output device specification information on the output device apparatus, which are designated by the information processing instruction information, from the input device control apparatus and the output device control apparatus respectively, and converts the information processing input information into a form, which enables to carry out the information processing, on the basis of the input device specification information, and converts the information processing output information into a form, which the output device apparatus can process, on the basis of the output device specification information.

4. The dynamic device allocation system according to claim 1, wherein in the case that the input device control apparatus inputs information which instructs to encrypt the information processing input information, the input device control apparatus encrypts the information processing input information, and inputs the encrypted information processing input information into any one of the information processing apparatuses, and wherein in the case that the information processing apparatus inputs information which instructs to encrypt the information processing output information, the information processing apparatus encrypts the information processing output information, and inputs the encrypted information processing output information into the output device control apparatus.

5. The dynamic device allocation system according to claim 4, wherein the information processing apparatus generates a common key which is used when encrypting information and when decoding encrypted information, and inputs the common key into the input device control apparatus and the output device control apparatus.

6. The dynamic device allocation system according to claim 1, wherein the information processing apparatus authenticates the input device apparatus and the output device apparatus, each of which is associated with the information processing, on the basis of the information processing instruction information.

7. The dynamic device allocation system according to claim 1, wherein the information processing apparatus is a server apparatus in a thin client system, and the input device apparatus and the output device apparatus are client apparatuses in the client system.

8. The dynamic device allocation system according to claim 1, wherein the information processing apparatus executes a hypervisor which realizes virtual machines, and executes processing which the dynamic device allocation apparatus executes.

9. The dynamic device allocation system according to claim 1, wherein the input device control apparatus communicates with the input device apparatus via a wireless interface, and the output device control apparatus communicates with the output device apparatus via a wireless interface.

10. The dynamic device allocation system according to claim 1, further comprising:

a television that includes the dynamic device allocation apparatus, the input device control apparatus and the output device control apparatus, wherein the television is capable of displaying both of a screen received from the information processing apparatus and a screen of broadcast, and, in accordance with information received from the plural input device apparatuses, executes information processing which is related to at least any one of inputting information to the information processing apparatus, inputting operation to the screen of the broadcast and changing a display position related to the screen received from the information processing apparatus and the screen of the broadcast.

11. The dynamic device allocation system according to claim 1, further comprising:

a mobile terminal that includes the dynamic device allocation apparatus and the input device control apparatus; and a head mount display that includes the output device control apparatus.

12. The dynamic device allocation system according to claim 1, wherein the input device apparatus outputs advertisement information, and the dynamic device allocation apparatus allocates one or more output device apparatuses which receive the advertisement information.

13. The dynamic device allocation system according to claim 1, comprising:

a large screen apparatus that includes the dynamic device allocation apparatus and plural screen areas to be the output device control apparatuses, wherein the large screen apparatus displays information received from the input device apparatus on any of the screen areas.

14. A dynamic device allocation method, comprising:

by a first information processing apparatus, storing device allocation information in a device allocation information storing unit, which is associating identifiers of three different apparatuses which are connected to be able to communicate, which include an input device identifier which can identify an input device apparatus inputting information into a designated second information processing apparatus, an output device identifier which can identify an output device apparatus inputting information which is outputted from the designated second information processing apparatus, and an information processing apparatus identifier capable of identifying the designated second information processing apparatus which inputs a result of information processing carried out to information, which is inputted from the input device apparatus which is designated, into the output device apparatus which is designated;

by the first information processing apparatus, generating the device allocation information, which specifies contents of the information processing, when the designated second information processing apparatus, the input device apparatus and the output device apparatus carry out the information processing, and registering the generated device allocation information with the device allocation information storing unit;

by the first information processing apparatus, generating information processing instruction information which instructs the input device apparatus, the output device apparatus and the second information processing apparatus to carry out the information processing according to the device allocation information which the device allocation information storing unit stores;

by the first information processing apparatus, carrying out the information processing on the basis of the information processing instruction information;

wherein input device control apparatuses connect the one or more input device apparatuses and the one or more information processing apparatuses, and each of which inputs information, which is outputted by any one of the input device apparatuses, into any one of the information processing apparatuses as information processing input information on the basis of the information processing instruction information; and wherein output device control apparatuses connect the one or more output device apparatuses and the one or more information processing apparatuses, and each of which inputs information processing output information, which is information outputted by any one of the information processing apparatuses, into at least any one of the output device apparatuses on the basis of the information processing instruction information.

\* \* \* \* \*